(12) United States Patent
Hughes

(10) Patent No.: US 6,662,280 B1
(45) Date of Patent: Dec. 9, 2003

(54) STORE BUFFER WHICH FORWARDS DATA BASED ON INDEX AND OPTIONAL WAY MATCH

(75) Inventor: William A. Hughes, Burlingame, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/482,399

(22) Filed: Jan. 12, 2000

Related U.S. Application Data

(60) Provisional application No. 60/164,526, filed on Nov. 10, 1999.

(51) Int. Cl.[7] .............................................. G06F 12/00
(52) U.S. Cl. ...................................... 711/156; 711/118
(58) Field of Search ................................ 711/118, 154, 711/155, 156

(56) References Cited

U.S. PATENT DOCUMENTS

| | | | |
|---|---|---|---|
| 5,276,828 A | 1/1994 | Dion | |
| 5,440,752 A | 8/1995 | Lentz et al. | |
| 5,487,156 A | 1/1996 | Popescu et al. | |
| 5,490,259 A | 2/1996 | Hiraoka et al. | |
| 5,557,763 A | 9/1996 | Senter et al. | |
| 5,625,835 A | 4/1997 | Ebcioglu et al. | |
| 5,652,859 A | 7/1997 | Mulla et al. | |
| 5,742,791 A | 4/1998 | Mahalingaiah et al. | |
| 5,751,983 A | 5/1998 | Abramson et al. | |
| 5,761,712 A | 6/1998 | Tran et al. | |
| 5,768,555 A | 6/1998 | Tran et al. | |
| 5,781,790 A | 7/1998 | Abramson et al. | |
| 5,802,588 A | 9/1998 | Ramagopal et al. | |
| 5,832,297 A | 11/1998 | Ramagopal et al. | |
| 5,848,433 A * | 12/1998 | Tran et al. | 711/137 |
| 5,887,152 A | 3/1999 | Tran | |
| 6,065,103 A | 5/2000 | Tran et al. | |
| 6,189,068 B1 * | 2/2001 | Witt et al. | 711/3 |
| 6,266,744 B1 * | 7/2001 | Hughes et al. | 711/146 |

FOREIGN PATENT DOCUMENTS

| | | |
|---|---|---|
| EP | 0 871 109 | 10/1998 |
| EP | 0 952 517 | 10/1999 |
| GB | 2 281 422 | 3/1995 |
| WO | 96/12227 | 4/1996 |

OTHER PUBLICATIONS

Franklin et al., "ARB: A Hardware Mechanism for Dynamic Reordering of Memory References," IEEE Transactions on Computers, vol. 45, No. 5, May 1996, pp. 552–571.
International Search Report, Application No. PCT/US 00/10961, mailed Jan. 2, 2001.
Leibholz et al., "The Alpha 21264: A 500 MHz Out-of-Order Execution Microprocessor," © 1997 IEEE, pp. 28–36.
Popescu et al., "The Metaflow Architecture," IEEE Micro Jun. 1991, pp. 10–13 and 63–73.

* cited by examiner

*Primary Examiner*—Matthew Kim
*Assistant Examiner*—Matthew D. Anderson
(74) *Attorney, Agent, or Firm*—Lawrence J. Merkel; Meyertons, Hood, Kivlin, Kowert & Goetzel, P.C.

(57) ABSTRACT

An apparatus includes a buffer configured to store information corresponding to store memory operations and circuitry to detect a load which hits one of the stores represented in the buffer. More particularly, the circuitry may compare the index portion of the load address to the index portions of the store addresses stored in the buffer. If the indexes match and both the load and the store are a hit in the data cache, then the load and store are accessing the same cache line. If one or more bytes within the cache line are updated by the store and read by the load, then the store data is forwarded for the load. In one embodiment, the circuitry speculatively forwards data if the load and store indexes match and the store is a hit in the data cache. Subsequently, when the load is determined to hit/miss in the cache, the forwarding is verified using the load's hit/miss indication. In set associative embodiments, the way in which the load hits is compared to the way in which the store hits to further verify the correctness of the forwarding.

24 Claims, 10 Drawing Sheets

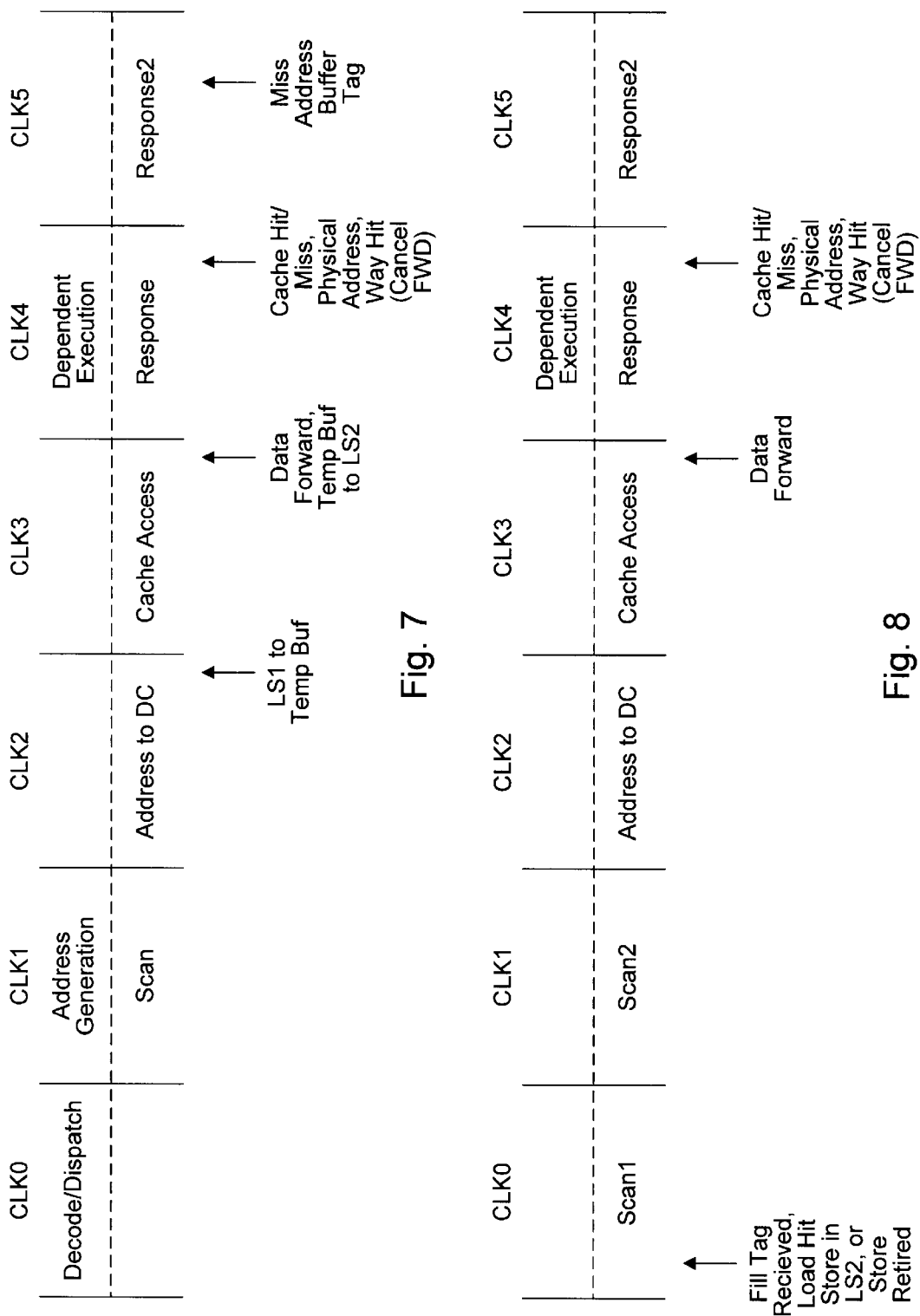

STORE BUFFER WHICH FORWARDS DATA BASED ON INDEX AND OPTIONAL WAY MATCH

This application claims the benefit of U.S. Provisional Application Ser. No. 60/164,526, filed on Nov. 10, 1999.

BACKGROUND OF THE INVENTION

1. Field of the Invention

This invention is related to the field of processors and, more particularly, to forwarding of data from a store buffer for a dependent load.

2. Description of the Related Art

Processors typically employ a buffer for storing store memory operations which have been executed (e.g. have generated a store address and may have store data) but which are still speculative and thus not ready to be committed to memory (or a data cache employed by the processor). As used herein, the term "memory operation" refers to an operation which specifies a transfer of data between a processor and memory (although the transfer may be accomplished in cache). Load memory operations specify a transfer of data from memory to the processor, and store memory operations specify a transfer of data from the processor to memory. Load memory operations may be referred to herein more succinctly as "loads", and similarly store memory operations may be referred to as "stores". Memory operations may be implicit within an instruction which directly accesses a memory operand to perform its defined function (e.g. arithmetic, logic, etc.), or may be an explicit instruction which performs the data transfer only, depending upon the instruction set employed by the processor. Generally, memory operations specify the affected memory location via an address generated from one or more operands of the memory operation. This address will be referred to herein in as a "data address" generally, or a load address (when the corresponding memory operation is a load) or a store address (when the corresponding memory operation is a store). On the other hand, addresses which locate the instructions themselves within memory are referred to as "instruction addresses".

Since stores may be queued in the buffer when subsequent loads are executed, the processor typically checks the buffer to determine if a store is queued therein which updates one or more bytes read by the load (i.e. to determine if the load is dependent on the store or "hits" the store). Generally, the load address is compared to the store address to determine if the load hits the store. If a hit is detected, the store data may be forwarded in place of cache data for the load. Thus, it is desirable to detect the hit in the same amount of time, or less, than the time needed to access data from the cache.

Minimizing the load latency (e.g. the time from executing a load to being able to use the data read by the load) is key to performance in many processors. Unfortunately, comparing addresses may be a time-consuming activity since the addresses may include a relatively large number of bits (e.g. 32 bits, or even greater than 32 bits and up to 64 bits is becoming common). Thus, reducing the amount of time required to determine if loads hit stores in the buffer may result in increased performance of the processor, since this reduction may reduce the load latency. Alternatively, meeting the timing constraints for a given cycle time and given load latency may be eased if the amount of time used to compare the addresses is reduced.

The use of virtual addressing and address translation may create an additional problem for reducing the amount of time elapsing during a check of the load address against store addresses in the buffer. When virtual addressing is used, the data address generated by executing loads and stores is a virtual address which is translated (e.g. through a paging translation scheme) to a physical address. Multiple virtual addresses may correspond to a given physical address (referred to as "aliasing") and thus physical data addresses of loads and stores are compared to ensure accurate forwarding (or the lack thereof) from the buffer. Unfortunately, the physical address of the load is typically generated from a translation lookaside buffer (TLB) and thus is often not available until the cache access is nearly complete, further worsening the problem of detecting hits on the stores in the buffer in rapid but accurate fashion.

SUMMARY OF THE INVENTION

The problems outlined above are in large part solved by an apparatus for forwarding store data for loads as described herein. The apparatus includes a buffer configured to store information corresponding to store memory operations and circuitry to detect a load which hits one of the stores represented in the buffer. More particularly, the circuitry may compare the index portion of the load address to the index portions of the store addresses stored in the buffer. If the indexes match and both the load and the store are a hit in the data cache, then the load and store are accessing the same cache line. If one or more bytes within the cache line are updated by the store and read by the load, then the store data is forwarded for the load. Advantageously, the relatively small compare of the load and store indexes may be completed rapidly. Additionally, since most (if not all) of the index is typically physical (untranslated) bits, the comparison may be performed prior to the load address being translated without significantly impacting the accuracy of the compare.

In one embodiment, the circuitry speculatively forwards data if the load and store indexes match and the store is a hit in the data cache. Subsequently, when the load is determined to hit/miss in the cache, the forwarding is verified using the load's hit/miss indication. In set associative embodiments, the way in which the load hits is compared to the way in which the store hits to further verify the correctness of the forwarding.

Broadly speaking, an apparatus is contemplated. The apparatus comprises a buffer and circuitry coupled to the buffer. The buffer includes a plurality of entries, wherein each of the plurality of entries is configured to store: (i) at least an index portion of a store address of a store memory operation, (ii) a hit indication indicative of whether or not the store memory operation hits in a data cache, and (iii) store data corresponding to the store memory operation. The circuitry is coupled to receive: (i) the index portion of a load address of a load memory operation probing the data cache, and (ii) a load hit signal indicative of whether or not the load memory operation hits in the data cache. The circuitry is configured to cause the store data to be forwarded from a first entry of the plurality of entries responsive to the index portion stored in the first entry matching the index portion of the load address and further responsive to the hit indication in the first entry indicating hit and the load hit signal indicating hit.

Additionally, a processor is contemplated comprising a data cache and a load/store unit coupled to the data cache. The load/store unit includes a buffer including a plurality of entries, wherein each of the plurality of entries is configured to store: (i) at least an index portion of a store address of a store memory operation, (ii) a hit indication indicative of whether or not the store memory operation hits in the data cache, and (iii) store data corresponding to the store memory operation. The load/store unit is configured to probe the data cache with a load address and to receive a hit signal in response thereto from the data cache. Additionally, the load/store unit is configured to determine that store data is to be forwarded from a first entry of the plurality of entries responsive to an index portion of the load address matching the index portion stored in the first entry and further responsive to the hit indication in the first entry indicating hit and the hit signal indicating hit.

Moreover, a method is contemplated. A data cache is probed with a load address. An index portion of the load address is compared to an index portion of a store address stored in a buffer. Store data corresponding to the store address is forwarded for a load memory operation corresponding to the load address. The forwarding is responsive to the comparing determining that the index portion of the load address matches the index portion of the store address and further responsive to both the load address and the store address hitting in a data cache.

BRIEF DESCRIPTION OF THE DRAWINGS

Other objects and advantages of the invention will become apparent upon reading the following detailed description and upon reference to the accompanying drawings in which:

FIG. 7 is a timing diagram corresponding to memory operations selected from the LS1 buffer shown in FIG. 4, according to one embodiment.

FIG. 8 is a timing diagram corresponding to memory operations selected from the LS2 buffer shown in FIG. 4, according to one embodiment.

Figure 1:
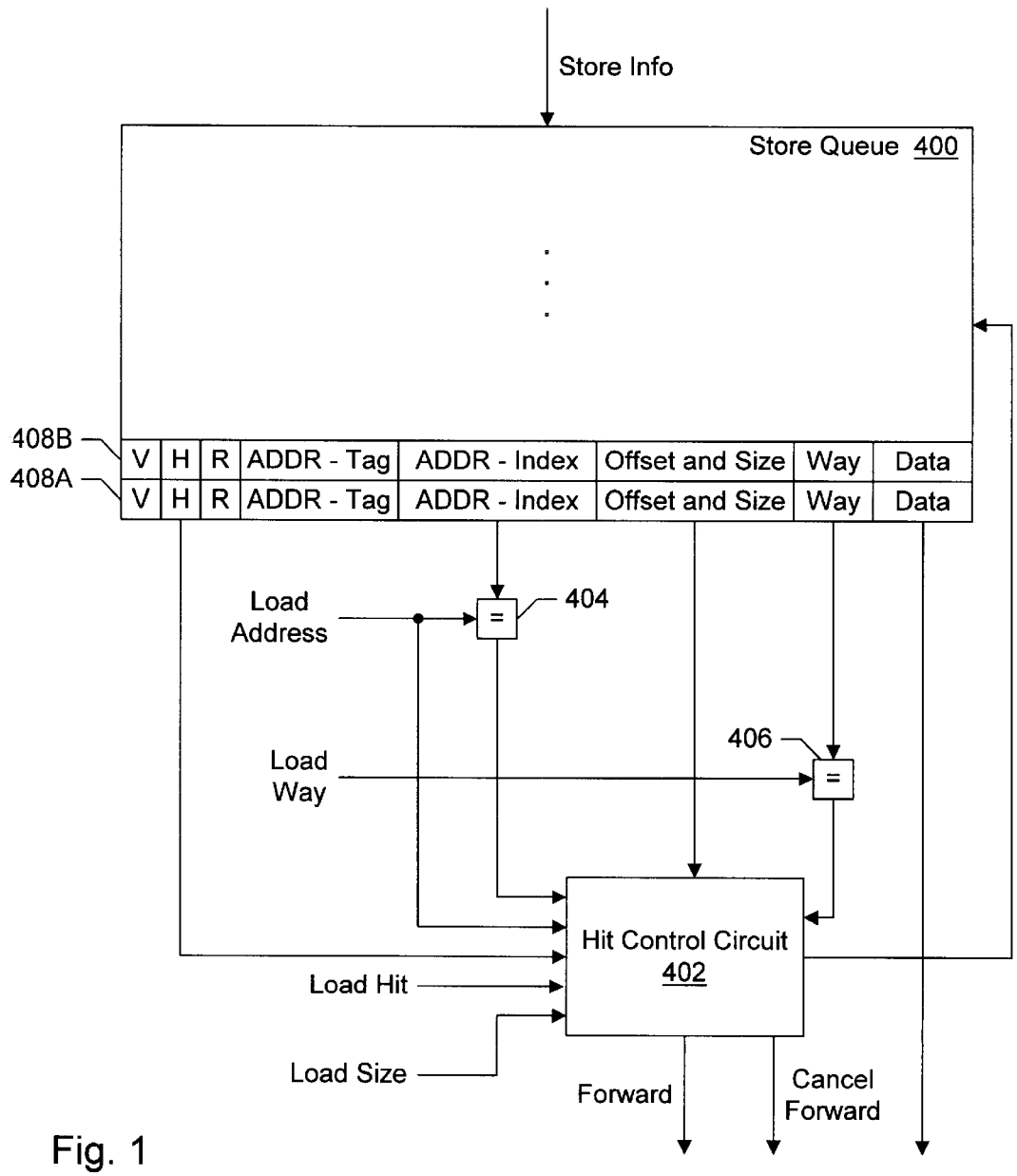
FIG. 1 is a block diagram of one embodiment of a store queue.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a store queue 400, a hit control circuit 402, and comparators 404 and 406 is shown. The apparatus shown in FIG. 1 may be used in a processor having a data cache to hold information related to stores until they may be committed to the data cache (and/or memory) and further may be used to detect loads which hit the stores and to forward store data from store queue 400 for the load. Other embodiments are possible and contemplated. In the embodiment of FIG. 1, store queue 400 is coupled to receive store information corresponding to executed stores and is further coupled to hit control circuit 402 and comparators 404 and 406. Comparators 404 and 406 are further coupled to hit control circuit 402. Hit control circuit 402 is coupled to provide a Forward signal and a Cancel Forward signal.

Generally speaking, the apparatus shown in FIG. 1 is configured to detect a load which hits a store represented in store queue 400 and to forward the data corresponding to the store from store queue 400 for that load (in place of cache data from the data cache). Rather than comparing the entire load address to the store addresses stored in store queue 400, the apparatus compares the index portion of the load address (the "load index") to the index portion of the store address (the "store index"). Since a portion of the address is compared, the comparison may be performed more rapidly and thus the amount of time to determine if a load hits a store represented in store queue 400 may be reduced. If both the load and a store are a hit in the data cache and the index portions match, then the load and the store may be accessing the same cache line in the data cache. If the data cache is direct-mapped, the load and the store are accessing the same cache line. If the data cache is set associative, then a comparison of the way which is hit by the store and the way which is hit by the load may be used to determine if the load and the store accessing the same cache line. If the load is a hit and the store is a miss (or vice versa), then the load and store are not accessing the same cache line (assuming none of the index portion is virtual) and thus the load does not hit the store and store data need not be forwarded from store queue 400. If both the load and the store are misses, the load and store may be accessing the same cache line. However, the data cache is not forwarding data from the cache for the load if the load is miss, and thus store data from store queue 400 need not be forwarded. The load may be reattempted after the data cache is filled with the cache line read by the load (or during the writing of fill data into the cache), and any stores to that cache line may become hits during the cache fill. Thus, the load hitting the store may be detected during the reattempt of the load.

Virtual to physical address translations are typically performed on a page granularity. The least significant address bits form an offset with the page, and are not modified by the translation. The most significant address bits are translated from virtual to physical. For example, in an embodiment employing 32 bits of virtual address and a 4 kilobyte page size, the least significant 12 bits are the page offset and the most significant 20 bits are translated. Other page sizes are contemplated. Typically, most (if not all) of the index portion of the address are bits within the page offset and thus are not modified during virtual to physical address translations. Thus, the effects of aliasing on the accuracy of the load hit store detection may be reduced or eliminated. Furthermore, the virtual load address may be used in the comparison, and store queue 400 may store the physical store address (which may be used to provide to memory, etc.). If one or more bits of the index portion are modified by the virtual to physical translation, the virtual bits may be stored as well. Thus, added storage for storing virtual store addresses for comparison to the virtual load addresses may be minimal (e.g. those bits which are translated and which are also part of the index).

The embodiment illustrated in FIG. 1 may be used in a processor employing a set associative data cache. Embodiments which employ a direct-mapped data cache may eliminate the way indications and associated comparators. More particularly, store queue 400 may comprise multiple entries. For example, entries 408A and 408B are illustrated in FIG. 1, and store queue 400 may include additional entries (not shown). Each entry 408 is configured to store information corresponding to a store memory operation. Store queue 400 may receive information corresponding to a store upon execution of the store, and may retain the information until after the store is retired and committed to the data cache and/or memory. In the illustrated embodiment, an entry may include a valid indication (V), a hit indication (H), a retired indication (R), an address tag portion (ADDR-Tag), an address index portion (ADDR-Index), offset and size information (Offset and Size), a way indication (Way), and data (Data). The valid indication indicates whether or not the entry is valid (e.g. whether or not a store is represented by information in the entry). The hit indication indicates whether or not the store is a hit in the data cache. The retired indication indicates whether or not the store is retired (and thus eligible to be committed to the data cache and/or memory). Any suitable indications may be used for the valid, hit, and retired indications. For example, each indication may comprise a bit indicative, when set, of one state and indicative when clear, of the other state. The remainder of this discussion (including the discussion of the embodiment shown below in FIGS. 5 and 6) will refer to the valid, hit, and retired indications as the valid, hit, and retired bits. However, other embodiments may reverse the encoding or use other encodings. The address tag portion is the portion of the address which is stored as a tag by the data cache, while the address index portion is the portion used as an index by the data cache. The offset and size information indicates which bytes within the cache line which are updated by the store. The way indication indicates which way in the data cache (for set associative embodiments) the store hits, if the hit bit is set (indicating the store hits). Finally, the data is the store data to be committed to the data cache and/or memory.

Comparator 404 is coupled to receive the store index from each entry in store queue 400 and is coupled to receive the load index of a load being executed. Comparator 404 compares the load and store indexes and, if a match is detected, asserts a signal to hit control circuit 402. Comparator 404 may thus represent a comparator circuit for each entry in store queue 400, and each comparator circuit may provide an output signal to hit control circuit 402. Similarly, comparator 406 is coupled to receive the way indication stored in each entry in store queue 400 and is coupled to receive the load way indication. Comparator 406 compares the load and store way indications and, if a match is detected, asserts a signal to hit control circuit 402. Comparator 406 may thus represent a comparator circuit for each entry in store queue 400, and each comparator circuit may provide an output signal to hit control circuit 402. It is noted that comparators 404 and 406 may be integrated into store queue 400 as a content-addressable memory (CAM) structure, if desired.

Hit control circuit 402 is coupled to receive the hit bits from each entry and a hit signal for the load being executed. If the load index and a store index of a store represented in store queue 400 match, the load and that store are a hit, and the way indications of the load and that store match, hit control circuit 402 causes data to be forwarded from store queue 400 for the load. More particularly, hit control circuit 402 may signal store queue 400 with an indication of the entry number of the entry being hit, and store queue 400 may provide the data from that entry for forwarding in place of the cache data from the data cache.

It is noted that the load address may be available for comparison at the beginning of the load's probe of the data cache, and the load's hit signal may not be determined until near the end of the probe to the data cache (e.g. after the load address is translated and compared to the cache tags). Additionally, the way indication for the load may not be determined until the hit signal is determined as well. Thus, hit control circuit 402 in the present embodiment is configured to signal the forwarding of data from store queue 400 (and to cause store queue 400 to forward the data) in response to the matching of the load index and a store index and the hit bit of that store indicating that the store is a hit. Hit control circuit 402 may assert the Forward signal illustrated in FIG. 1 to signal the forwarding of data. Subsequently, the hit signal and the way indication may be determined for the load. Hit control circuit 402 may verify that the load hits the store by comparing the load way indication to the store way indication and verifying that the hit signal is asserted to indicate a hit. If the way indications match and the load's hit signal indicates hit, then hit control circuit 402 determines that the forwarding was correct. On the other hand, if the forwarding was incorrect, hit control circuit 402 may assert the Cancel Forward signal illustrated in FIG. 1 to inform portions of the processor which received the forwarded store data of the incorrect forwarding. In one particular embodiment, the forwarding of data may be performed in a first clock cycle and the cancelling of the forwarding may be performed in a second clock cycle subsequent to the first.

The above discussion has described the operation of the apparatus shown in FIG. 1 for a single load being executed. However, embodiments are contemplated in which multiple loads are executed concurrently. Each load may be concurrently handled as described above.

Comparing the load and store indexes (and the ways hit by the data addresses) may determine that the load and store are accessing the same cache line. Additional information may be used to determine that the store updates at least one byte read by the load. For example, the offset portion of the address and the size (i.e. number of bytes) affected by the load and store may be used. The offset and size information may be provided and encoded in any suitable format, according to design choice. For example, the offset and size information may comprise a byte enable mask with a bit for each byte in the cache line. If the bit is set, the corresponding byte is accessed. Each bit of the byte enable mask for the load and store may be ANDed together to determine if that byte is both read by the load and written by the store. The byte enable mask may be generated for a portion of the cache line (e.g. one bank, if the cache has multiple banks per cache line) and the portion of the offset used to select the bank may be compared between the load and store addresses in addition to ANDing the byte enable mask bits. The portion of the offset of the load and store addresses may be compared using comparator 404 in addition to the index comparison. Hit control circuit 402 may use the offset and size information to determine whether or not to cause the forwarding of data stored in store queue 400 for the load (in addition to the index comparisons, hit bits, and way indications described above).

It is noted that more than one entry of store queue 400 may be hit during execution of the load. Hit control circuit 402 may determine the youngest (most recently executed) store in program order among the stores corresponding to entries which are hit and may forward the data from that entry. It is further noted that one or more bytes read by the load may not be updated by a store hit by the load for one or more other bytes read by the load. In such cases, the data cache may merge the store data with cache data to provide the bytes read by the load. If multiple stores provide different bytes of the bytes read by a load, the load may be retried and reattempted. One or more of the multiple stores may be retired and committed to the data cache and the bytes updated by those stores and read by the load may be provided from the data cache. Alternatively, the apparatus of FIG. 1 may merge the bytes from the different stores to provide the load data. Other embodiments may handle the above scenarios in other fashions, as desired.

It is noted that, while comparator 406 is shown for comparing the way indications stored in store queue 400 to the load's way indication, an alternative embodiment may read the way indication from an entry used to forward data for a load (where the forwarding is based on the index comparison and the store hitting in the data cache), and the way indication that is read may be compared to the load way indication to verify that the load and the store hit in the same way.

As used herein, the index portion of an address (or simply the "index") is the portion used to select one or more cache entries which are eligible to store data corresponding to that address. Additionally, a data address "hits" in a data cache if data identified by the data address is stored in the data cache. The data address "misses" in a data cache if data identified by the data address is stored in the data cache. Additionally, a set associative data cache includes multiple cache entries which are eligible to store a cache line corresponding to a given index. Each entry is a different way for that index.

Figure 2:
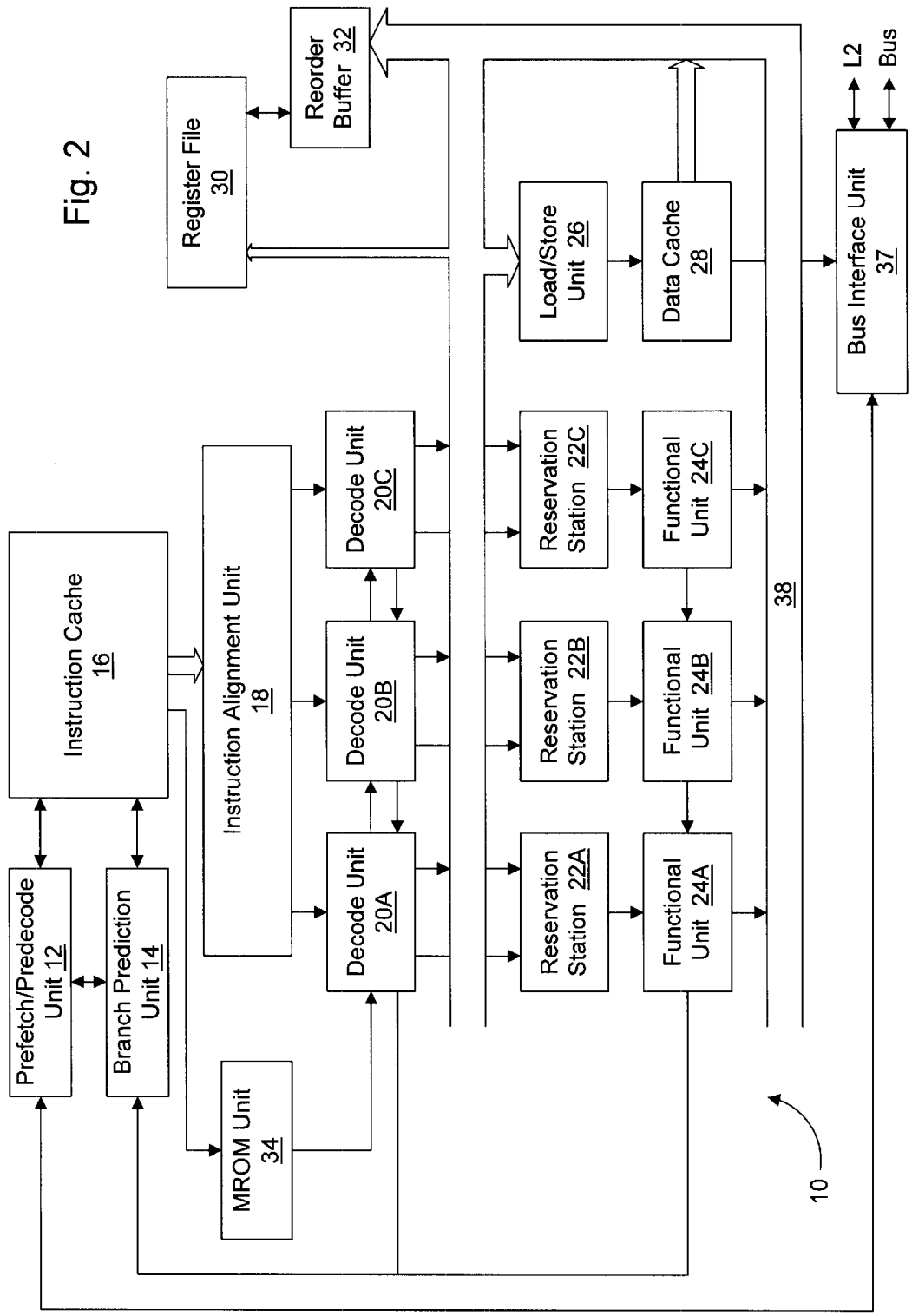
FIG. 2 is a block diagram of one embodiment of a processor.

FIG. 2 below illustrates an exemplary embodiment of a processor which may employ store queue 400 within a load/store unit. Alternatively, the processor and load/store unit may employ the queueing structure described with respect to FIGS. 4–6. Other processor embodiments are contemplated as well which may use either the apparatus of FIG. 1 or the embodiment of FIGS. 4–6.

Processor Overview

Turning now to FIG. 2, a block diagram of one embodiment of a processor 10 is shown. Other embodiments are possible and contemplated. As shown in FIG. 2, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a bus interface unit 37. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken",in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 2, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A.

Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have access data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high speed cache memory provided to temporarily store data being transferred between load/store unit 26 and the main memory subsystem. In one embodiment, data cache 28 has a capacity of storing up to 64 kilobtes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bi-directional links, etc. An optional L2 cache interface may be employed as well for interfacing to a level two cache.

Load/Store Unit

Figure 3:
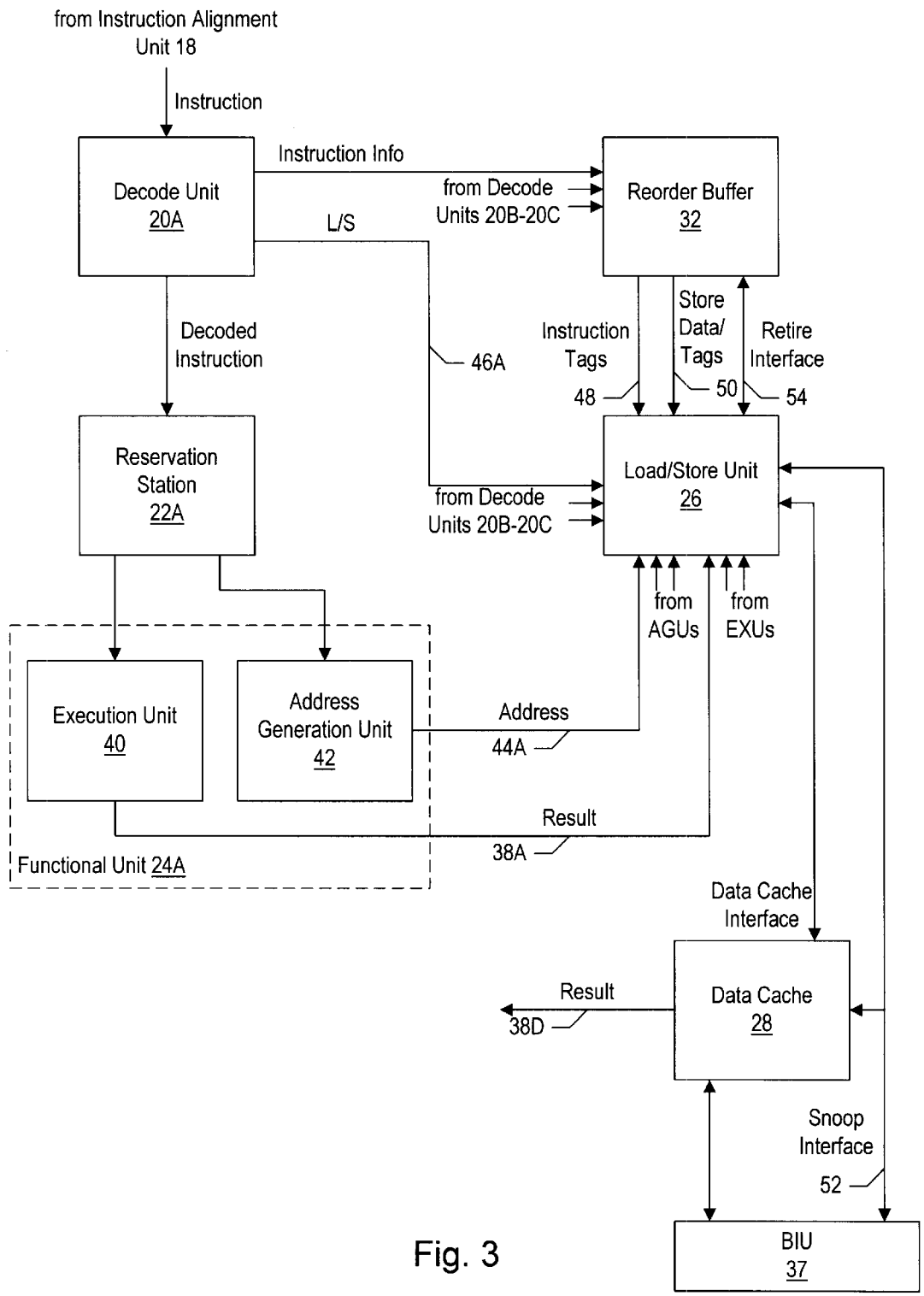
FIG. 3 is a block diagram illustrating one embodiment of a decode unit, a reservation station, a functional unit, a reorder buffer, a load/store unit, a data cache, and a bus interface unit illustrated in FIG. 2, highlighting one embodiment of interconnect therebetween.

A more detailed discussion of one embodiment of load/store unit 26 is next provided. Other embodiments are possible and contemplated. FIG. 3 illustrates load/store unit 26, reorder buffer 32, data cache 28, bus interface unit (BIU) 37, decode unit 20A, reservation station 22A, and functional unit 24A to highlight certain interconnection therebetween according to one embodiment of processor 10. Other embodiments may employ additional, alternative, or substitute interconnect as desired. Interconnect between decode units 20B–20C, reservation stations 22B–22C, functional units 24B–24C, and other units shown in FIG. 3 may be similar to that shown in FIG. 3.

Decode unit 20A receives an instruction from instruction alignment unit 18 and decodes the instruction. Decode unit 20A provides the decoded instruction to reservation station 22A, which stores the decoded instruction until the instruction is selected for execution. Additionally, if the instruction specifies a load or store memory operation, decode unit 20A signals load/store unit 26 via L/S lines 46A. Similar signals from decode units 20B–20C may be received by load/store unit 26 as well. L/S lines 46A indicate whether a load memory operation, a store memory operation, or both are specified by the instruction being decoded. For example, L/S lines 46A may comprise a load line and a store line. If no memory operation is specified, then signals on both lines are deasserted. The signal on the load line is asserted if a load memory operation is specified, and similarly the signal on the store line is asserted if a store memory operation is specified. Both signals are asserted if both a load memory operation and a store memory operation are specified. In response to signals on L/S lines 46A, load/store unit 26 allocates an entry in a load/store buffer included therein to store the corresponding memory operation.

In addition to the above, decode unit 20A provides information to reorder buffer 32 about the instruction being decoded. Reorder buffer 32 receives the information (as well as similar information from other decode units 20B–20C) and allocates reorder buffer entries in response thereto. The allocated reorder buffer entries are identified by reorder buffer tags, which are transmitted to load/store unit 26 upon an instruction tags bus 48. Instruction tags bus 48 may be configured to transmit a tag for each possible instruction (e.g. three in the present embodiment, one from each of decode units 20A–20C). Alternatively, in an embodiment employing the line-oriented structure described above, reorder buffer 32 may be configured to transmit a line tag for the line, and load/store unit 26 may augment the line tag with the offset tag of the issue position which is signalling a particular load or store.

Reorder buffer 32 is further configured to perform dependency checking for register operands of the instruction. The register operands are identified in the instruction information transmitted by decode units 20. For store memory operations, the store data is a source operand which load/store unit 26 receives in addition to the store address. Accordingly, reorder buffer 32 determines the instruction which generates the store data for each store memory operation and conveys either the store data (if it is available within reorder buffer 32 or register file 30 upon dispatch of the store memory operation) or a store data tag for the store data on a store data/tags bus 50. If the instruction corresponding to the store memory operation is an explicit store instruction which stores the contents of a register to memory, the instruction tag of the instruction which generates the store data (or the store data, if it is available) is conveyed. On the other hand, the instruction itself generates the store data if the instruction includes the store memory operation as an implicit operation. In such cases, reorder buffer 32 provides the instruction tag of the instruction as the store data tag.

Although not illustrated in FIG. 3 for simplicity in the drawing, reservation station 22A receives operand tags and/or data for the instruction from reorder buffer 32 as well. Reservation station 22A captures the operand tags and/or data and awaits delivery of any remaining operand data (identified by the operand tags) from result buses 38. Once an instruction has received its operands, it is eligible for execution by functional unit 24A. More particularly, in the embodiment shown, functional unit 24A includes an execution unit (EXU) 40 and an address generation unit (AGU) 42. Execution unit 40 performs instruction operations (e.g. arithmetic and logic operations) to generate results which are forwarded on result bus 38A (one of result buses 38) to load/store unit 26, reservation stations 22, and reorder buffer 32. AGU 42 generates data addresses for use by a memory operation or operations specified by the instruction, and transmits the data addresses to load/store unit 26 via address bus 44A. It is noted that other embodiments may be employed in which AGU 42 and execution unit 40 share result bus 38A and in which functional unit 24A includes only an execution unit which performs address generation and other instruction execution operations. Load/store unit 26 is further coupled to receive result buses and address buses from the execution units and AGUs within other functional units 24B–24C as well.

Since the embodiment shown employs AGU 42, reservation station 22A may select the address generation portion of an instruction for execution by AGU 42 once the operands used to form the address have been received but prior to receiving any additional operands the instruction may specify. AGU 42 transmits the generated address to load/store unit 26 on address bus 44A, along with the instruction tag of the instruction for which the data address is generated. Accordingly, load/store unit 26 may compare the tag received on address bus 44A to the instruction tags stored in the load/store buffer to determine which load or store the data address corresponds to.

Load/store unit 26 monitors the result tags provided on result buses 38 to capture store data for store memory operations. If the result tags match a store data tag within load/store unit 26, load/store unit 26 captures the corresponding data and associates the data with the corresponding store instruction.

Load/store unit 26 is coupled to data cache 28 via a data cache interface. Load/store unit 26 selects memory operations to probe data cache 28 via the data cache interface, and receives probe results from the data cache interface. Generally speaking, a "probe" of the data cache for a particular memory operation comprises transmitting the data address of the particular memory operation to data cache 28 for data cache 28 to determine if the data address hits therein. Data cache 28 returns a probe result (e.g. a hit/miss indication) to load/store unit 26. In addition, if the particular memory operation is a load and hits, data cache 28 forwards the corresponding load data on a result bus 38D to reservation stations 22, reorder buffer 32, and load/store unit 26. In one embodiment, data cache 28 includes two ports and may thus receive up to 2 probes concurrently. Data cache 28 may, for example, employ a banked configuration in which cache lines are stored across at least two banks and two probes may be serviced concurrently as long as they access different banks. In one particular embodiment, data cache 28 may employ 8 banks. Various embodiments of the data cache interface are described in further detail below.

Data cache 28 is configured to allocate cache lines in response to probes that miss, and communicates with bus interface unit 37 to fetch the missing cache lines. Additionally, data cache 28 transmits evicted cache lines which have been modified to bus interface unit 37 for updating main memory.

Bus interface unit 37 is coupled to data cache 28 and load/store unit 26 via a snoop interface 52 as well. Snoop interface 52 may be used by bus interface unit 37 to determine if coherency activity needs to be performed in response to a snoop operation received from the bus. Generally, a "snoop operation" is an operation performed upon a bus for the purpose of maintaining memory coherency with respect to caches connected to the bus (e.g. within processors). When coherency is properly maintained, a copy of data corresponding to a particular memory location and stored in one of the caches is consistent with the copies stored in each other cache. The snoop operation may be an explicit operation, or may be an implicit part of an operation performed to the address of the particular memory location. Generally, the snoop operation specifies the address to be snooped (the "snoop address") and the desired state of the cache line if the address is stored in the cache. Bus interface unit transmits a snoop request via snoop interface 52 to data cache 28 and load/store unit 26 to perform the snoop operation.

Reorder buffer 32 manages the retirement of instructions. Reorder buffer 32 communicates with load/store unit 26 via retire interface 54 to identify instructions either being retired or ready for retirement. For example, in one embodiment stores do not update data cache 28 (or main memory) until they are retired. Additionally, certain load instructions may be restricted to be performed non-speculatively. Reorder buffer 32 may indicate memory operations which are retired or retireable to load/store unit 26 via retirement interface 54. Accordingly, the instruction information provided by decode units 20 to reorder buffer 32 for each instruction may include an indication of whether or not the instruction includes a load or store operation. Load/store unit 26 may return an acknowledgment to reorder buffer 32 that a particular memory operation is logged as retired, and reorder buffer 32 may subsequently retire the corresponding instruction.

Since the load/store buffer may become full at times, load/store unit 26 may employ a flow control mechanism to stall subsequent memory operations at decode units 20 until sufficient entries are freed (via completion of earlier memory operations) within the load/store buffer for the subsequent memory operations. For example, load/store unit 26 may broadcast a count of the number of free entries to decode units 20, which may stall if the count indicates that insufficient entries are available for the memory operations of instructions being decoded. According to one particular embodiment, the instructions being concurrently decoded by decode units 20 move to reservation stations 22 in lockstep (so that a line may be allocated in reorder buffer 32 for the instructions, as described above with respect to FIG. 2). In such an embodiment, decode units 20 may stall until sufficient entries are available for all memory operations within the set of concurrently decoded instructions. Alternatively, load/store unit 26 may employ a stall signal for stalling subsequent memory operations until buffer entries are available. Any suitable flow control mechanism may be used.

Figure 4:
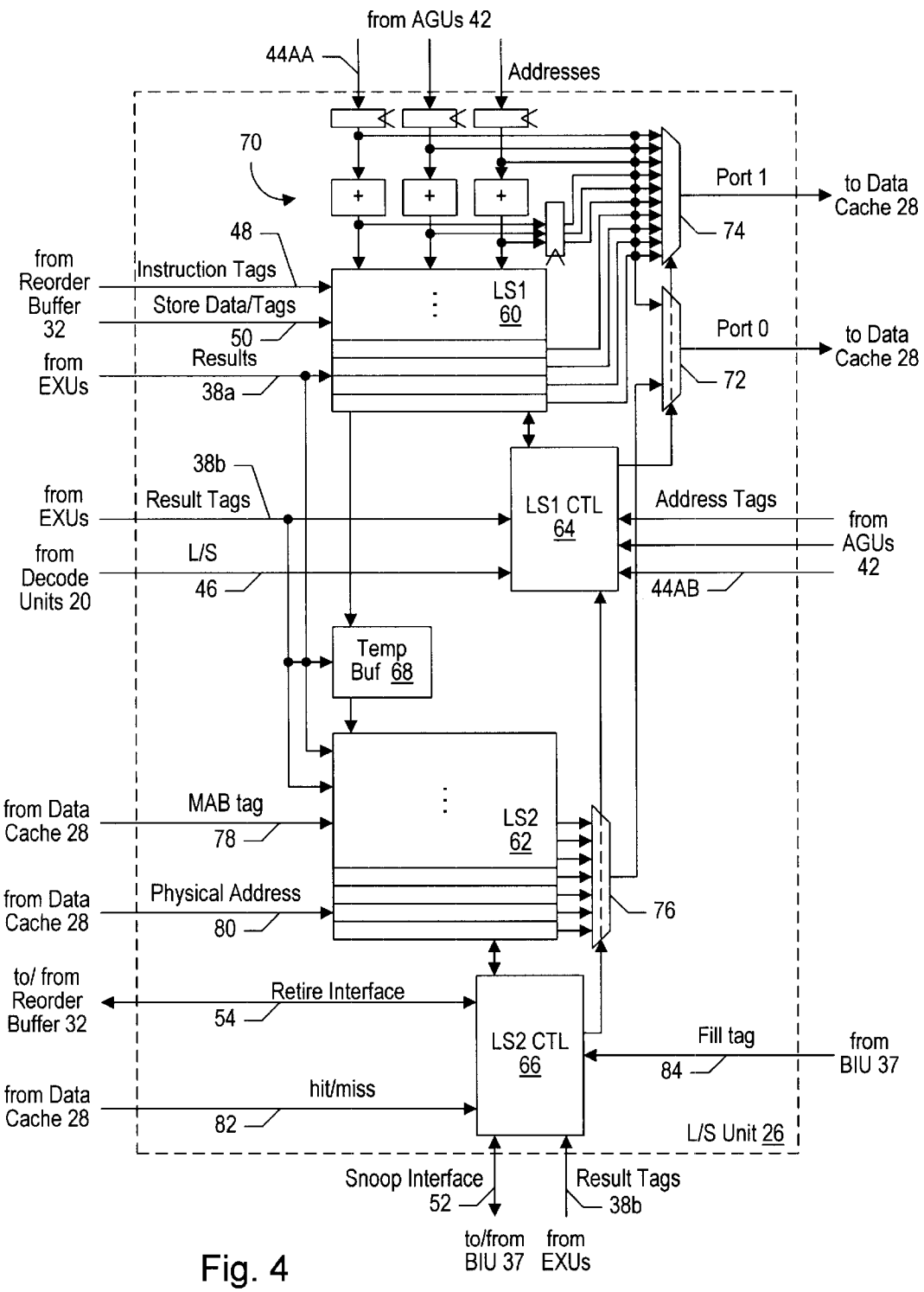
FIG. 4 is a block diagram of one embodiment of a load/store unit shown in FIGS. 2 and 3.

Turning now to FIG. 4, a block diagram of one embodiment of load/store unit 26 is shown. Other embodiments are possible and contemplated. In the embodiment of FIG. 4, load/store unit 26 includes a first load/store buffer (LS1 buffer) 60, a second load/store buffer (LS2 buffer) 62, an LS1 control circuit 64, an LS2 control circuit 66, a temporary buffer 68, segment adders 70, a port 0 multiplexor (mux) 72, a port 1 mux 74, and an LS2 reprobe mux 76. Segment adders 70 are coupled to receive data addresses from AGUs 42 within functional units 24A–24C (e.g. address bus 44AA, part of address bus 44A shown in FIG. 3, conveys the data address from AGU 42 within functional unit 24A). Muxes 70 and 72 are coupled to receive the data addresses from AGUs 42 and the outputs of segment adders 70, as well as being coupled to LS1 buffer 60. Mux 72 also receives an input from LS2 reprobe mux 76. Furthermore, LS1 buffer 60 is coupled to segment adders 70, LS1 control circuit 64, temporary buffer 68, instruction tags bus 48, store data/tags bus 50, and results buses 38a (the result data portion of result buses 38). LS1 control circuit 64 is coupled to muxes 72 and 74 and to LS2 control circuit 66. Furthermore, LS1 control circuit 64 is coupled to receive address tags from AGUs 42 (e.g. address tag bus 44AB, part of address tag bus 44A shown in FIG. 3, conveys the address tag from AGU 42 within functional unit 24A), result tags via result tags buses 38b (the result tag portion of result buses 38), and L/S lines 46 (including L/S lines 46A from decode unit 20A). Temporary buffer 68 and LS2 buffer 62 are coupled to results buses 38a and result tags buses 38b. LS2 buffer 62 is further coupled to receive a miss address buffer (MAB) tag on a MAB tag bus 78 and a physical address on a physical address bus 80 from data cache 28. LS2 buffer 62 is still further coupled to mux 76, LS2 control circuit 66, and temporary buffer 68. LS2 control circuit 66 is further coupled to mux 76, retire interface 54, result tags buses 38b, snoop interface 52, hit/miss signals 82 from data cache 28, and a fill tag bus 84 from bus interface unit 37.

Generally speaking, load/store unit 26 includes a pre-cache buffer (LS1 buffer 60) and a post-cache buffer (LS2 buffer 62). Memory operations are allocated into LS1 buffer 60 upon dispatch within processor 10, and remain within LS1 buffer 60 until selected to probe data cache 28. Subsequent to probing data cache 28, the memory operations are moved to LS2 buffer 62 independent of the probe status (e.g. hit/miss, etc.).

Memory operations which miss may subsequently be selected through LS2 reprobe mux 76 and port 0 mux 72 to reprobe data cache 28. The term "reprobe", as used herein, refers to probing a cache for a second or subsequent attempt after the first probe for a particular memory operation. Additionally, store memory operations may be held in LS2 buffer 62 until the stores are in condition for retirement.

In response to signals on L/S lines 46, LS1 control circuit 64 allocates entries within LS1 buffer 60 to the identified load and store memory operations. The respective instruction tags and store data/tags (if applicable) are received into the allocated entries by LS1 buffer 60 under the control of LS1 control circuit 64. Subsequently, the corresponding data addresses are received from the AGUs (identified by the address tags received by LS1 control circuit 64) and are stored into the allocated entries.

A memory operation which has received its address becomes eligible to probe data cache 28. LS1 control circuit 64 scans the LS1 buffer entries for memory operations to probe data cache 28, and generates selection controls for port 0 mux 72 and port 1 mux 74. Accordingly, up to two memory operations may probe data cache 28 per clock cycle in the illustrated embodiment. According to one particular implementation, LS1 control circuit 64 selects memory operations for probing data cache 28 in program order. Accordingly, LS1 control circuit 64 may be configured to limit scanning to the oldest memory operations within LS1 buffer 60. The "program order" of the memory operations is the order the instructions would be executed in if the instructions were fetched and executed one at a time. Furthermore, the program order of instructions speculatively fetched (according to branch predictions, for example) is the order the instructions would be executed in as stated above under the assumption that the speculation is correct. Instructions which are prior to other instructions in the program order are said to be older than the other instructions. Conversely, instructions which are subsequent to other instructions in program order are said to be younger than the other instructions. It is noted that other implementations may select memory operations to probe data cache 28 out of order, as desired.

LS1 control circuit 64 is configured to select a memory operation to probe data cache 28 as the data address is received (provided, in the present embodiment, that the memory operation is within an entry being scanned by LS1 control circuit 64). If the address tags received from the AGUs 42 match an instruction tag of an otherwise selectable memory operation, LS1 control circuit 64 selects the corresponding data address received from the AGU 42 via one of muxes 72 and 74.

While the data address may be selected for probing as it is provided to load/store unit 26, the data address is also provided to one of segment adders 70. Segment adders 70 are included in the present embodiment to handle the segmentation portion of the x86 addressing scheme. Embodiments which do not employ the x86 instruction set architecture may eliminate segment adders 70. Generally, AGUs 42 generate a logical address corresponding to the memory operation. The logical address is the address generated by adding the address operands of an instruction. In the x86 architecture, a two-tiered translation scheme is defined from the logical address to a linear address through a segmentation scheme and then to the physical address through a paging scheme. Since AGUs 42 add the address operands of the instruction, the data address provided by the AGUs is a logical address. However, modern instruction code is generally employing a "flat addressing mode" in which the segment base addresses (which are added to the logical address to create the linear address) are programmed to zero. Accordingly, load/store unit 26 presumes that the segment base address is zero (and hence the logical and linear addresses are equal) and selects the logical address to probe data cache 28. Segment adders 70 add the segment base address of the selected segment for the memory operation and provide the linear address to muxes 72 and 74 and to LS1 buffer 60 for storage. If the segment base address for a particular memory operation is non-zero and the memory operation was selected to probe data cache 28 upon receiving the logical address, LS1 control circuit 64 may cancel the previous access (such that load data is not forwarded) and select the corresponding linear address from the output of the corresponding segment adder 70 for probing data cache 28. In other alternative embodiments, AGUs 42 may receive the segment base address and generate linear addresses. Still other embodiments may require flat addressing mode and segment base addresses may be ignored.

Muxes 72 and 74 are coupled to receive data addresses from entries within LS1 buffer 60 as well. The data address corresponding to a memory operation is stored in the LS1 entry assigned to the memory operation upon receipt from the AGUs 42. The data address is selected from the entry upon selecting the memory operation to probe data cache 28. It is noted that, in addition to the data address, other information may be transmitted to data cache 28 via muxes 70 and 72. For example, an indication of whether the memory operation is a load or store may be conveyed. The instruction tag of the memory operation may be conveyed for forwarding on result buses 38D with the load data for load memory operations. The size of the operation (for muxing out the appropriate data) may be conveyed as well. Any desirable information may be transmitted according to design choice.

Store data may be provided for a store memory operation while the store memory operation resides in LS1 buffer 60.

Accordingly, LS1 control circuit 64 may monitor result tags buses 38b. If a tag matching a store data tag within LS1 buffer 64 is received, the corresponding store data from the corresponding one of result buses 38a is captured into the entry having the matching store data tag.

LS1 control circuit 64 removes memory operations from LS1 buffer 60 in response to the memory operations probing data cache 28. In one particular embodiment, memory operations are removed the cycle after they are selected for probing data cache 28. The cycle after may be used to allow, in cases in which a memory operation is selected upon generation of the data address by one of AGUs 42, for the data address to propagate into LS1 buffer 60. Other embodiments may chose to remove the memory operations during the cycle that the memory operations are selected. Because the memory operations are removed the cycle after they are selected, LS1 control circuit 64 is configured to scan the oldest 4 entries in LS1 buffer 60 to select memory operations for probing data cache 28 (up to two entries selected in the previous clock cycle and up to two entries being selectable in the present clock cycle).

Memory operations removed from LS1 buffer 60 are moved to temporary buffer 68. Temporary buffer 68 may be provided to ease timing constraints in reading entries from LS1 buffer 60 and writing them to LS2 buffer 62. Accordingly, temporary buffer 68 is merely a design convenience and is entirely optional. The clock cycle after a memory operation is moved into temporary buffer 68, it is moved to LS2 buffer 62. Since store data may be received upon results buses 38 during the clock cycle a store memory operation is held in temporary buffer 68, temporary buffer 68 monitors result tags on result tags buses 38b and captures data from result buses 38a in a manner similar to LS1 buffer 60 capturing the data.

Accordingly, memory operations which have probed data cache 28 are placed into LS2 buffer 62. In the present embodiment, all memory operations are placed into LS2 buffer 62 after an initial probe of data cache 28. Stores are held in LS2 buffer 62 until they can be committed to data cache 28 (i.e. until they are allowed to update data cache 28). In general, stores may be committed when they become non-speculative. In one embodiment, stores may be committed in response to their retirement (as indicated via retirement interface 54) or at any time thereafter. Loads are held in LS2 buffer 62 until they retire as well in the present embodiment. Load hits remain in LS2 buffer 62 for snooping purposes. Load misses are held in LS2 at least until the cache line accessed by the load is being transferred into data cache 28. In response to the cache line (or portion thereof including the load data) being scheduled for updating the cache, the load miss is scheduled for reprobing data cache 28. Upon reprobing, the load miss becomes a load hit (and the load data is forwarded by data cache 28) and is retained as such until retiring.

LS2 control circuit 66 allocates entries within LS2 buffer 62 for memory operations which have probed data cache 28. Additionally, LS2 control circuit 66 receives probe status information from data cache 28 for each of the probes on hit/miss signals 82. The hit/miss information is stored in the LS2 buffer entry corresponding to the memory operation for which the probe status is provided. In one embodiment, data cache 28 includes address translation circuitry which, in parallel with access to the data cache, attempts to translate the virtual address to the physical address. If a translation is not available within the address translation circuitry, the probe may be identified as a miss until a translation is established (by searching software managed translation tables in main memory, for example). In one specific implementation, the address translation circuitry within data cache 28 comprises a two level translation lookaside buffer (TLB) structure including a 32 entry level-one TLB and a 4 way set associative, 256 entry level-two TLB.

If the data address of the memory operation is successfully translated by data cache 28, the corresponding physical address is provided on physical address bus 80. LS2 control circuit causes the corresponding entry to overwrite the virtual address with the physical address. However, certain virtual address bits may be separately maintained for indexing purposes on reprobes and store data commits for embodiments in which data cache 28 is virtually indexed and physically tagged.

For memory operations which miss data cache 28, data cache 28 allocates an entry in a miss address buffer included therein. The miss address buffer queues miss addresses for transmission to bus interface unit 37, which fetches the addresses from the L2 cache or from main memory. A tag identifying the entry within the miss address buffer (the MAB tag) is provided on MAB tag bus 78 for each memory operation which misses. It is noted that data cache 28 allocates miss address buffer entries on a cache line basis. Accordingly, subsequent misses to the same cache line receive the same MAB tag and do not cause an additional miss address buffer entry to be allocated.

Bus interface unit 37 subsequently fetches the missing cache line and returns the cache line as fill data to data cache 28. Bus interface unit 37 also provides the MAB tag corresponding to the cache line as a fill tag on fill tag bus 84. LS2 control circuit 66 compares the fill tag to the MAB tags within LS2 buffer 62. If a match on the MAB tag occurs for a load memory operation, then that load may be selected for reprobing data cache 28. If more than one match is detected, the oldest matching load may be selected with other memory operations selected during subsequent clock cycles. Stores which match the MAB tag are marked as hits, but wait to become non-speculative before attempting to commit data.

In one embodiment, the cache line of data is returned using multiple packets. Each load memory operation may record which packet it accesses (or the packet may be discerned from the appropriate address bits of the load address), and bus interface unit 37 may identify the packet being returned along with the fill tag. Accordingly, only those loads which access the packet being returned may be selected for reprobing.

Bus interface unit 37 provides the fill tag in advance of the fill data to allow a load to be selected for reprobing and to be transmitted to data cache 28 via port 0 to arrive at the data forwarding stage concurrent with the packet of data reaching data cache 28. The accessed data may then be forwarded.

Since stores are moved to LS2 buffer 62 after probing data cache 28 and subsequent loads are allowed to probe data cache 28 from LS1 buffer 60 and forward data therefrom, it is possible that a younger load accessing the same memory location as an older store will probe data cache 28 prior to the older store committing its data to data cache 28. The correct result of the load is to receive the store data corresponding to the older store. Accordingly, LS2 control circuit 66 monitors the probe addresses and determines if older stores to those addresses are within LS2 buffer 62. If a match is detected and the store data is available within LS2 buffer 62, LS2 control circuit 66 signals data cache 28 to select data provided from LS2 buffer 62 for forwarding and provides the selected data. On the other hand, if a match is detected and the store data is not available within LS2 buffer 62, forwarding of data from data cache 28 is cancelled. The load is moved into LS2 buffer 62, and is selected for reprobing until the store data becomes available. Additional details regarding store to load forwarding are provided further below.

Generally, LS2 control circuit 66 is configured to scan the entries within LS2 buffer 62 and select memory operations to reprobe data cache 28. Load misses are selected to reprobe in response to the data being returned to data cache 28. Loads which hit older stores are selected to reprobe if they are not currently reprobing. Stores are selected to reprobe in response to being retired. If multiple memory operations are selectable, LS2 control circuit 66 may select the oldest one of the multiple memory operations. If LS2 control circuit 66 is using port 0 (via port 0 mux 72), LS2 control circuit 66 signals LS1 control circuit 64, which selects the LS2 input through port 0 mux 72 and disables selecting a memory operation from LS1 buffer 60 on port 0 for that clock cycle.

LS2 control circuit 66 is further coupled to receive snoop requests from bus interface unit 37 via snoop interface 52. Generally, memory operations in LS2 buffer 62 are snooped since they have probed data cache 28 and hence may need corrective action in response to the snoop operation. For example, load hits (which have forwarded data to dependent instructions) may need to be discarded and reexecuted. Stores may be storing a cache state from their probe, which may need to be changed. By contrast, memory operations within LS1 buffer 60 have not probed data cache 28 and thus may not need to be snooped.

LS2 control circuit 66 receives the snoop request, examines the LS2 buffer entries against the snoop request, and responds to bus interface unit 37 via snoop interface 52. Additionally, LS2 control circuit 66 may perform updates within LS2 buffer entries in response to the snoop.

Generally speaking, a buffer is a storage element used to store two or more items of information for later retrieval. The buffer may comprise a plurality of registers, latches, flip-flops, or other clocked storage devices. Alternatively, the buffer may comprise a suitably arranged set of random access memory (RAM) cells. The buffer is divided into a number of entries, where each entry is designed to store one item of information for which the buffer is designed. Entries may be allocated and deallocated in any suitable fashion. For example, the buffers may be operated as shifting first-in, first-out (FIFO) buffers in which entries are shifted down as older entries are deleted. Alternatively, head and tail pointers may be used to indicate the oldest and youngest entries in the buffer, and entries may remain in a particular storage location of the buffer until deleted therefrom. Store queue 400, illustrated in FIG. 1, may be one type of buffer. The term "control circuit" as used herein, refers to any combination of combinatorial logic circuits, clock storage circuits, and/or state machines which performs operations on inputs and generates outputs in response thereto in order to effectuate the operations described.

It is noted that, in one embodiment, load/store unit 26 attempts to overlap store probes from LS1 with the data commit of an older store on the same port. This may be performed because the store probe is only checking the data cache tags for a hit/miss, and is not attempting to retrieve or update data within the data storage. It is further noted that, while the above description refers to an embodiment in which all memory operations are placed in LS2 buffer 62, other embodiments may not operate in this fashion. For example, load hits may not be stored in LS2 buffer 62 in some embodiments. Such embodiments may be employed, for example, if maintaining strong memory ordering is not desired.

Store to Load Forwarding

Figure 5:
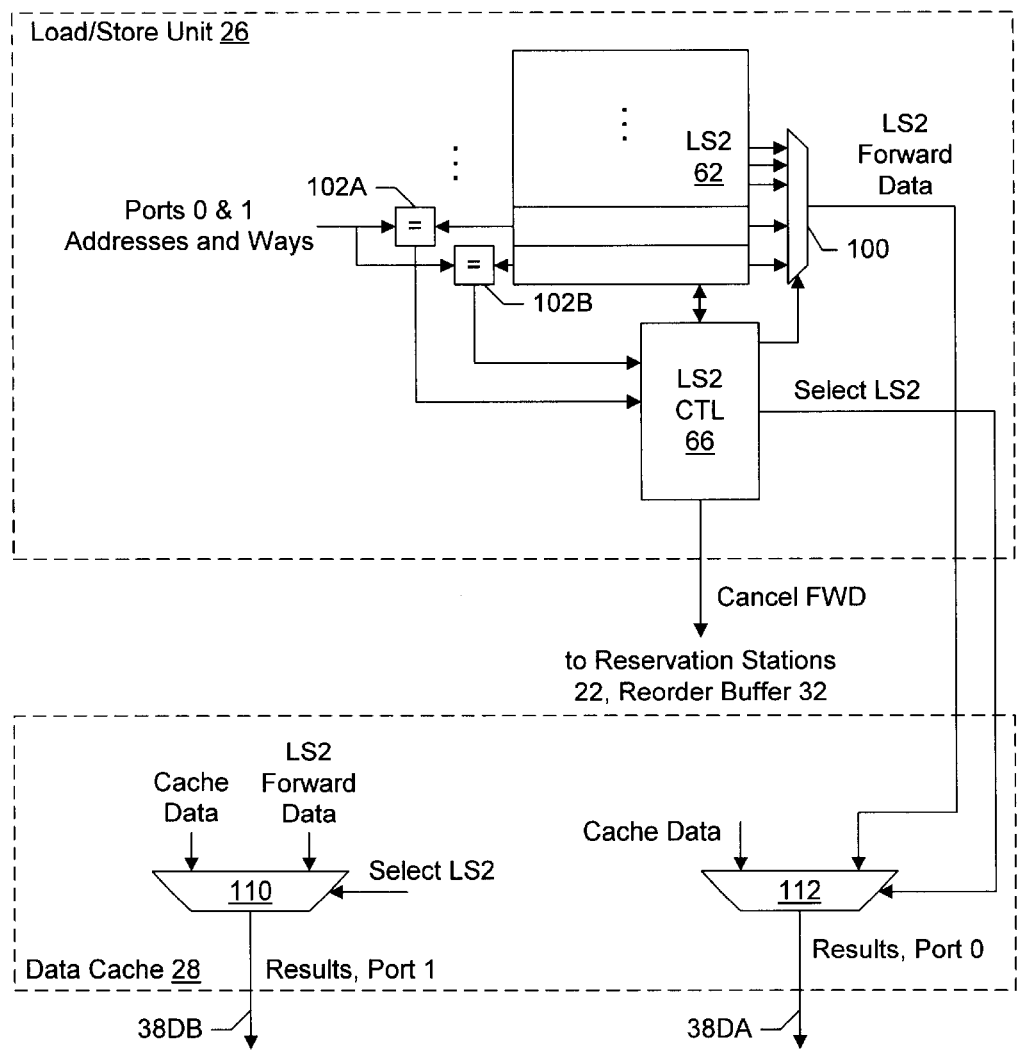
FIG. 5 is a block diagram of a portion of one embodiment of a load/store unit and a data cache.

FIG. 5 illustrates one embodiment of a portion of load/store unit 26 and data cache 28. Other embodiments are possible and contemplated. In the embodiment of FIG. 5, load/store unit 26 includes LS2 buffer 62, LS2 control circuit 66, a data forward mux 100, and address and way comparators 102A–102B. Additionally, in the embodiment of FIG. 5, data cache 28 includes a port 1 data mux 110 and a port 0 data mux 112. LS2 buffer 62 is coupled to data forward mux 100, comparators 102A–102B, and LS2 control circuit 66. LS2 control circuit 66 is further coupled to muxes 100, 110, and 112. LS2 control circuit 66 is further coupled to comparators 102A–102B. Comparators 102A–102B are coupled to receive data addresses and ways presented on ports 0 and 1 of data cache 28. Mux 112 is coupled to provide results on result bus 38DA, and similarly mux 110 is coupled to provide results on result bus 38DB. Result buses 38DA–38DB may form one embodiment of result buses 38D as shown in FIG. 3.

Generally speaking, load/store unit 26 is configured to handle the cases in which a probing load memory operation hits an older store memory operation stored in LS2 buffer 62. Load/store unit 26 compares index portions of data addresses of memory operations probing data cache 28 from LS1 buffer 60 to index portions of data addresses of memory operations within LS2 buffer 62. If the indexes match and the memory operations are hits in data cache 28 to the same way of data cache 28, then the probing memory operation hits a store in LS2 buffer 62. If a probing load hits a store in LS2 buffer 62 and the store data is available with LS2 buffer 62, the store data is transmitted to data cache 28 for forwarding in place of any load data which may be in cache. On the other hand, a probing load may hit a store in LS2 buffer 62 for which store data is not available. For this case, forwarding of data from data cache 28 is cancelled and the load memory operation is selected for reprobing from LS2 buffer 62 until the store data becomes available. Eventually, the store data may become available within LS2 buffer 62 and forwarded therefrom during a reprobing by the load, or the store may update data cache 28 and the data may be forwarded from data cache 28 during a reprobing by the load.

Generally speaking, store data is "available" from a storage location if the store data is actually stored in that storage location. If the data may at some later point be stored in the storage location but is not yet stored there, the data is "not available", "not yet available", or "unavailable". For example, store data may be not available in a LS2 buffer entry if the store data has not been transmitted from the source of the store data to the LS2 buffer entry. The source of the store data is the instruction which executes to produce the store data, and may be the same instruction to which the store corresponds (an instruction specifying a memory operand as the destination) or may be an older instruction. The store data tag identifies the source of the store data and hence is compared to result tags from the execution units 40 to capture the store data.

As described above, load addresses and way indications are compared to store addresses and way indications within LS2 buffer 62 to detect loads which hit older stores. Accordingly, comparators such as comparators 102 are provided. Comparators 102 are provided to compare addresses and way indications on each port of data cache 28 to the data addresses and way indications stored within LS2 buffer 62. It is further noted that comparators 102 may be integrated into LS2 buffer 62 as a CAM structure, if desired.

If a load hit on a store entry is detected and the corresponding store data is available, LS2 control circuit 66 selects the store data using data forward mux 100, and provides the data to either port 0 mux 112 or to port 1 mux 110, based upon the port for which the hit is detected. Accordingly, data forward mux 100 may comprise a set of independent muxes, one for each port. Additionally, LS2 control circuit 66 asserts a corresponding signal to data cache 28 for data cache 28 to select the forwarded data in place of cache data read from data cache 28 for the hitting load.

It is further noted that, while the present embodiment is shown for use with LS2 buffer 62, other embodiments are contemplated in which the above store forwarding mechanism is performed with a conventional store queue storing only store memory operations which have probed data cache 28 (e.g. store queue 400 may be used in one particular embodiment). It is still further noted that, while muxes 110 and 112 are shown within data cache 28, this circuitry may be employed within load/store unit 26, as desired. Additionally, it is noted that, while mux 100 is shown for selecting data from LS2 buffer 62 for forwarding, mux 100 may be eliminated in favor of providing a read entry number to LS2 buffer 62 from which data is read, if LS2 buffer 62 is a RAM structure rather than discrete clocked storage devices (e.g. registers).

It is still further noted that, in one particular implementation, load/store unit 26 may employ a dependency link file to accelerate the forwarding of data when a load which hits a store for which the corresponding store data is not available is detected. In response to detecting such a load, load/store unit 26 may allocate an entry in the dependency link file for the load. The dependency link file entry stores a load identifier (e.g. the instruction tag assigned by reorder buffer 32 to the instruction corresponding to the load) identifying the load which hits the store and a store data identifier (e.g. the store data tag) identifying the source of the store data corresponding to the store hit by the load. Load/store unit 26 may then monitor results buses 38 for the store data tags stored within the dependency link file. Upon detecting that store data is being provided on one of result buses 38, load/store unit 26 may direct data cache 28 to forward the data from the corresponding result bus onto a result bus from data cache 28. Additionally, the load identifier from the corresponding entry may be forwarded as the result tag. It is noted that the dependency link file is an entirely optional performance enhancement. Embodiments which do not employ the dependency link file are contemplated.

Figure 6:
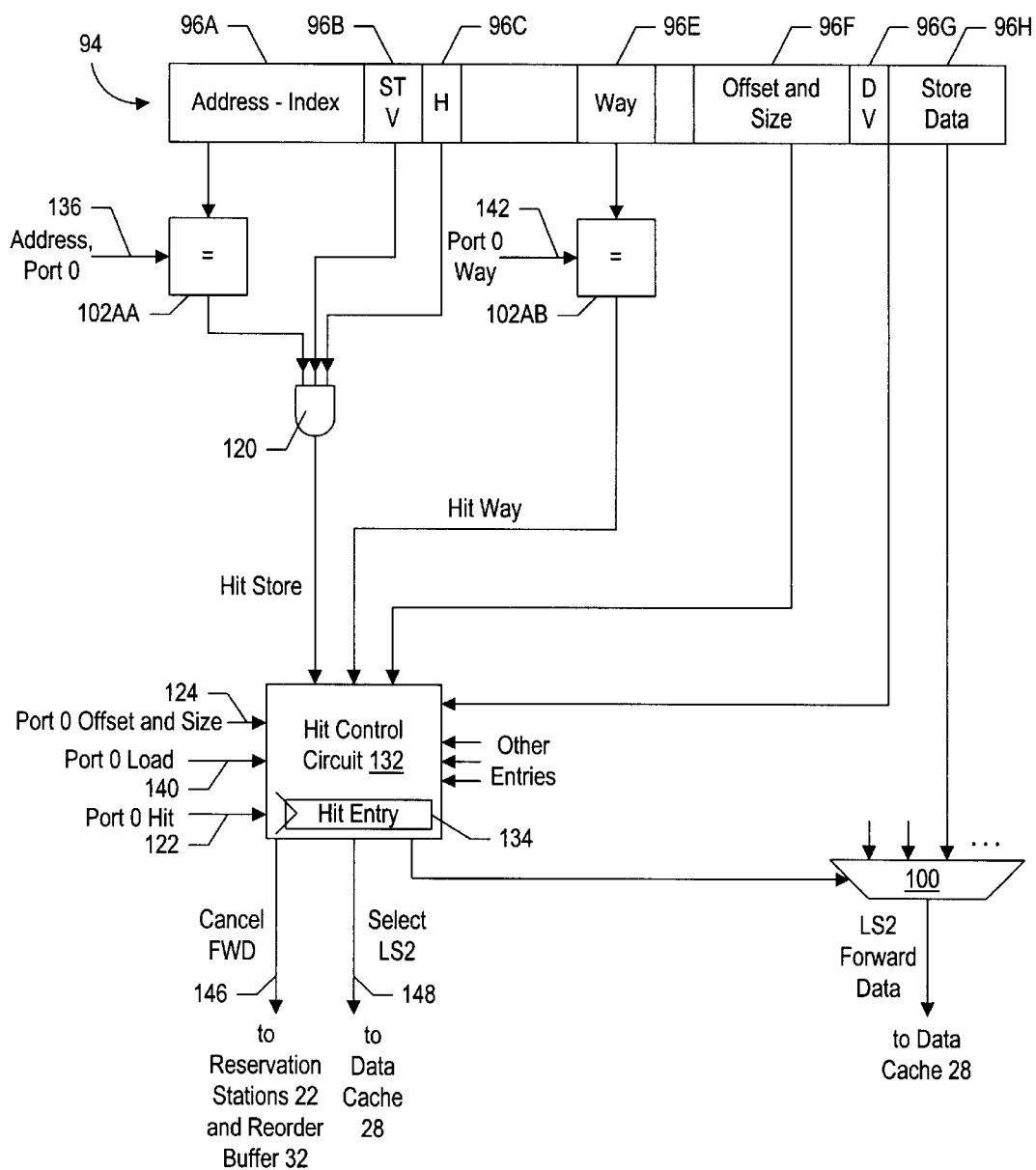
FIG. 6 is a block diagram illustrating a portion of a control circuit shown in FIG. 5.

Turning now to FIG. 6, a block diagram of a portion of one embodiment of LS2 control circuit 66 and an LS2 entry 94 is shown. Other embodiments and specific implementations are contemplated. The embodiment of FIG. 6 includes: a comparator 102AA; a comparator 102AB, AND gate 120; hit control circuit 132; and data forward mux 100. Hit control circuit 132 includes a hit entry register 134. Comparator 102AA is coupled to receive at least the index portion of the data address from port 0 (reference numeral 136) and to receive the index portion of the data address stored in address—index field 96A of entry 94. Comparator 102AA provides an output to AND gate 120, which is further coupled to receive a store valid bit (ST V field 96B) and a hit bit (H field 96C) from entry 94. The output of AND gate 120 is coupled as a hit store signal to hit control circuit 132, which further receives a port 0 load signal (reference numeral 140), a port 0 Hit signal (reference numeral 122), and port 0 offset and size information (reference numeral 124). Comparator 102AB is coupled to receive the contents of way field 96E and is coupled to receive a Port 0 way indication (reference numeral 142). Comparator 102AB is coupled to provide an output as a hit way signal to hit control circuit 132. Hit control circuit 132 is further coupled to receive a data valid bit from data valid field 96G and offset and size information from offset and size field 96F. Similar hit store, hit way, data valid, and offset and size signals corresponding to other entries may be received by hit control circuit 132 as well. Hit control circuit 132 is coupled to provide cancel data FWD signals to reservation stations 22 and reorder buffer 32 (reference numeral 146) and select LS2 signals to data cache 28 (reference numeral 148). Additionally, hit control circuit 132 is coupled to provide selection controls to mux 100. Mux 100 is coupled to receive the store data from store data field 96H (and store data from other LS2 buffer entries).

Generally, the logic illustrated in FIG. 6 may detect a hit on a store in entry 94 by a load on port 0. Similar logic may be employed with respect to port 1 and entry 94, and with respect to both ports for other entries. More particularly, comparator 102AA compares the index portion of the data address on port 0 to the index in address—index field 96C. If the indexes match, comparator 102AA asserts its output signal. AND gate 120 receives the output signal of comparator 102AA and combines the output signal with the store valid bit and hit bit. The store valid bit indicates whether or not entry 94 is storing information corresponding to a store memory operation (since entry 94 and other LS2 buffer entries may store information corresponding to either loads or stores), and the hit bit indicates whether or not the store hit in data cache 28 when the store probed data cache 28. Thus, the hit store signal provided by AND gate 120 is indicative, when asserted, that the load index hits a store index which is a hit in data cache 28.

Hit control circuit 132 combines the hit store signal corresponding to entry 94 and other hit store signals corresponding to port 0 and the Port 0 load signal 140 to generate data forwarding signals for the memory operation on port 0. In the present embodiment, hit control circuit 132 may detect two cases for loads: (i) hit store signal asserted and the corresponding data valid bit 96G is set; and (ii) hit store signal asserted and the corresponding data valid bit 96G is clear. If no hit store signal is asserted or the memory operation on port 0 is not a load, then hit control circuit 132 is idle for that memory operation. Similar hit control circuitry may be employed for the memory operation on port 1, in the present embodiment.

For case (i), hit control circuit 132 generates mux select signals for data forward mux 100, causing data forward mux 100 to select the store data from store data field 96H of the LS2 buffer entry corresponding to the asserted hit store signal. For example, if the hit store signal generated by AND gate 120 is asserted, hit control circuit 132 causes mux 100 to select store data from store data field 96H from entry 94 and asserts the select LS2 signal 148 corresponding to port 0 mux 112. The selected data is forwarded by data cache 28 as described above for FIG. 5. For case (ii), hit control circuit 132 may assert a cancel FWD signal 146 to reservation stations 22 and reorder buffer 32, informing these units to ignore data forwarded for the load on port 0 during that clock cycle.

Accordingly, hit control circuit 132 forwards data from entry 94 based on the match of the store index in entry 94 with the load index and the store having been a hit in data cache 28. Particularly, it may not yet be determined if the load hits in data cache 28 or if the load and the store hit in the same way. This information may not be available until the end of the load's probe, which occurs in a subsequent clock cycle in the present embodiment. Thus, hit control circuit 132 may capture the entry number of LS2 buffer 62 from which data is forwarded in hit entry register 134. During the subsequent clock cycle, hit control circuit 132 may determine if the data forwarding from LS2 buffer 62 is correct. The data forwarding is correct if the load is a hit in data cache 28 (signalled on port 0 hit signal 122) and the way indications for the load and store in the entry identified by hit entry register 134 match (e.g. if comparator 102AB detects a match between the way indication for port 0 and the way indication from way field 96E, if entry 94 is indicated by hit entry register 134). If the forwarding is incorrect, hit control circuit 132 may assert a cancel FWD signal 146 to inform reservation stations 22 and/or reorder buffer 32 to ignore data previously forwarded on port 0. Hit control circuit 132 may provide separate cancel data FWD signals 146 for cancelling forwarding due to data not being available (as described above) and due to incorrect forwarding for a load which is a miss or hits in a different way than the store from which the data is forwarded, since these signals may be asserted at different times for the same load.

As noted above with respect to FIG. 1, hit control circuit 132 may further determine whether or not store data from LS2 buffer 62 is to be forwarded for a load by using the offset (within the cache line) and size information for the load and store to determine if at least one byte read by the load is updated by the store. The offset and size information may be provided in any convenient format, as described above (e.g. some combination of address bits and byte enable masks). It is noted that, if hit control circuit 132 compares a portion of the offset of the load and store addresses, then that portion may be compared in comparator 102AA in addition to the index portion, if desired.

It is still further noted that hit control circuit 132 may detect a hit on more than one store for a given load. Hit control circuit 132 may determine the youngest store which is older than the load for forwarding of data. Alternatively, each LS2 buffer entry may include a last in buffer indication which identifies the last store in LS2 buffer 62 which updates a given address. The LIB indication may be used in AND gate 120 to prevent the assertion of the hit store signal except for the youngest store in LS2 buffer 62. Thus, prioritization of multiple hits may be avoided. As stores are placed into LS2 buffer 62, their LIB bits may be set and the LIB bits of any older stores to the same address may be cleared.

It is noted that, while comparator 102AB is shown for comparing the way indications stored in LS2 buffer entry 94 to the load's way indication, an alternative embodiment may read the way indication from an entry used to forward data for a load (where the forwarding is based on the index comparison and the store hitting in the data cache), and the way indication that is read may be compared to the load way indication to verify that the load and the store hit in the same way. The way indication may be stored in a register similar to hit entry register 134 for the subsequent comparison.

It is further noted that one or more bytes read by the load may not be updated by a store hit by the load for one or more other bytes read by the load. In such cases, the data cache may merge the store data with cache data to provide the bytes read by the load. If multiple stores provide different bytes of the bytes read by a load, the load may be retried and reprobed. One or more of the multiple stores may be retired and committed to the data cache and the bytes updated by those stores and read by the load may be provided from the data cache. Alternatively, the apparatus of FIG. 6 may merge the bytes from the different stores to provide the load data. Other embodiments may handle the above scenarios in other fashions, as desired.

It is noted that the logic illustrated in FIG. 6 is exemplary only. Any suitable combinatorial logic (including any Boolean equivalents of the logic shown) may be employed. It is further noted that entry 94 is an exemplary LS2 buffer entry. Entry 94 may store additional information above what is shown in FIG. 6, according to design choice.

Turning next to FIG. 7, a timing diagram is shown illustrating an exemplary pipeline for a memory operation probing data cache 28 from LS1 buffer 60. Other embodiments employing different pipelines are possible and contemplated. In FIG. 7, clock cycles are delimited by vertical solid lines. A horizontal dashed line is shown as well. Pipeline stages related to other portions of processor 10 are shown to illustrate the interface of other elements to load/store unit 26.

Clock cycle CLK0 is the decode/dispatch cycle for an instruction specifying the memory operation. During clock cycle CLK0, the decode unit 20 decoding the instruction signals load/store unit 26 regarding the memory operation. LS1 control circuit 64 allocates an LS1 buffer entry for the memory operation during the decode/dispatch stage for the corresponding instruction. Additionally, the decode unit 20 transmits the decoded instruction to the corresponding reservation station 22.

During clock cycle CLK1, the address generation unit generates the data address for the memory operation and transmits the data address to load/store unit 26. During this clock cycle, the memory operation participates in the scan performed by LS1 control circuit 64 (by virtue of the data address being provided) and is selected to probe data cache 28. Accordingly, the memory operation is in the scan pipeline stage of the LS1 pipeline.

During clock cycle CLK2, the data address is transmitted to data cache 28. As illustrated by the arrow within clock cycle CLK2, the memory operation is moved from LS1 buffer 60 to temporary buffer 68 at the end of clock cycle CLK2. The memory operation is in the address to data cache stage of the LS1 pipeline during clock cycle CLK2.

During clock cycle CLK3, the data address accesses data cache 28. Data corresponding to the memory operation (if the memory operation is a load) is forwarded at the end of clock cycle CLK3. More particularly, if the index portion of the load address matches the index portion of a store address in LS2 buffer 62 and the store is a hit in data cache 28, data from LS2 buffer 62 may be forwarded in place of cache data in clock cycle CLK3. Additionally, the memory operation is moved from temporary buffer 68 to LS2 buffer 62. The memory operation is in the cache access stage during clock cycle CLK3.

During clock cycle CLK4, an instruction dependent upon the memory operation (if the memory operation is a load) may be executed. Accordingly, the pipeline illustrated in FIG. 7 provides for a three clock cycle address generation to dependent operation execution load latency. Additionally, the memory operation is in the response pipeline stage during clock cycle CLK4. Data cache 28 provides hit/miss information (including a way indication for a hit) and the physical address during the response stage. Accordingly, LS2 control circuit 66 associates hit/miss information and the physical address with a memory operation in the response stage. Still further, the hit/miss indication and way indication for a load is used to confirm data forwarded from LS2 buffer 62 during clock cycle CLK3 (if applicable). If the data forwarded is incorrectly forwarded due to the load being a miss or hitting in a different way, the cancel FWD signal is asserted.

During clock cycle CLK5, the memory operation is in a response2 pipeline stage. During this stage, the miss address buffer tag identifying the miss address buffer entry assigned to the cache line accessed by the memory operation (if the memory operation is a miss) is provided by data cache 28. Accordingly, LS2 control circuit 66 associates a MAB tag received from data cache 28 with a memory operation in the response2 stage.

Turning next to FIG. 8, a timing diagram illustrating an exemplary pipeline for a memory operation reprobing data cache 28 from LS2 buffer 62 is shown. Other embodiments employing different pipelines are possible and contemplated. In FIG. 8, clock cycles are delimited by vertical solid lines. A horizontal dashed line is shown as well. Pipeline stages related to other portions of processor 10 are shown to illustrate the interface of other elements to load/store unit 26.

During clock cycle CLK0, the memory operation participates in a scan of LS2 buffer entries and is selected to reprobe data cache 28. As illustrated by the arrow beneath clock cycle CLK0, the memory operation may be selected if a fill tag matching the MAB tag for the memory operation is received, if the memory operation is a load which hits an older store within LS2 buffer 62 (for which the data was not available on the previous probe), or if the memory operation is a store which has been retired by reorder buffer 32.

During clock cycle CLK1, the memory operation selected during the Scan1 stage enters the Scan2 stage. During the Scan2 stage, the memory operation is selected through muxes 76 and 72 for transmission to data cache 28. Accordingly, LS2 control circuit 66 selects the memory operation in the Scan2 stage through multiplexor 76. Clock cycles CLK2, CLK3, CLK4, and CLK5 are the address to data cache, cache access, response, and response2 stages of the LS2 buffer reprobe pipeline and are similar to the corresponding stages described above. Accordingly, for the present embodiment, bus interface unit 37 may provide the MAB tag 4 clocks prior to providing the corresponding data, to allow selection of a load which accesses that corresponding fill data to be in the cache access stage during the clock cycle in which the fill data arrives at data cache 28 (and hence the fill data may be forwarded).

It is noted that the timing between the instruction pipeline stages above the dotted lines in FIGS. 7 and 8 and the memory operation pipeline stages below the dotted lines may be extended from those shown in FIGS. 7 and 8. For example, in FIG. 7, the address may not be generated exactly in the clock cycle immediately following the decode/dispatch cycle. Operands may not be available, or older instructions may be selected for address generation instead. Furthermore, a memory operation may not be scanned for access during the clock cycle the address is provided, as other older memory operations may be scanned instead.

Figure 9:
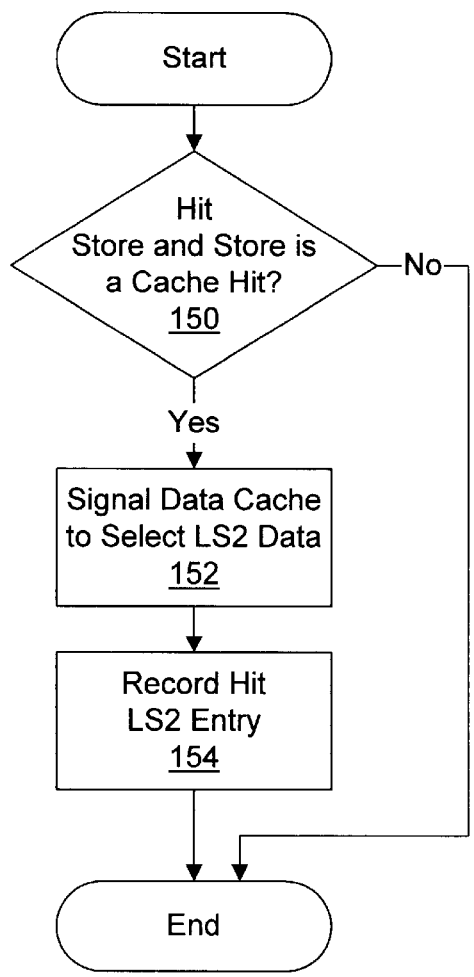
FIG. 9 is a flowchart illustrating operation of one embodiment of the control circuit shown in FIG. 6 during detection of a load address hitting a store address.

Turning next to FIG. 9, a flowchart is shown illustrating operation of one embodiment of hit control circuit 132 during the probing of a load to select data for forwarding from LS2 buffer 62 (e.g. during the cache access pipeline stage of a load's probe). Other embodiments are possible and contemplated. While the steps shown in FIG. 9 are illustrated in a particular order for ease of understanding, any suitable order may be used. Additionally, steps may be performed in parallel by combinatorial logic within hit control circuit 132.

Hit control circuit 132 determines whether or not the load hits a store and the store is a cache hit (decision block 150). More particularly, hit control circuit 132 may determine that a load hits a store if the load index matches the store index (and offset and size information matches). The determination is verified as correct or incorrect when load hit information and way indication is available in the subsequent clock cycle (as illustrated below in FIG. 10). If decision block 150 results in a "yes", hit control circuit 132 signal data cache 28 to select data provided from LS2 buffer 62 instead of cache data and muxes the data out of the entry which is hit (step 152) and records the LS2 buffer entry which is hit in hit entry register 134 (step 154). If decision block 150 results in a "no", then hit control circuit 132 takes no additional action with respect to the load.

Figure 10:
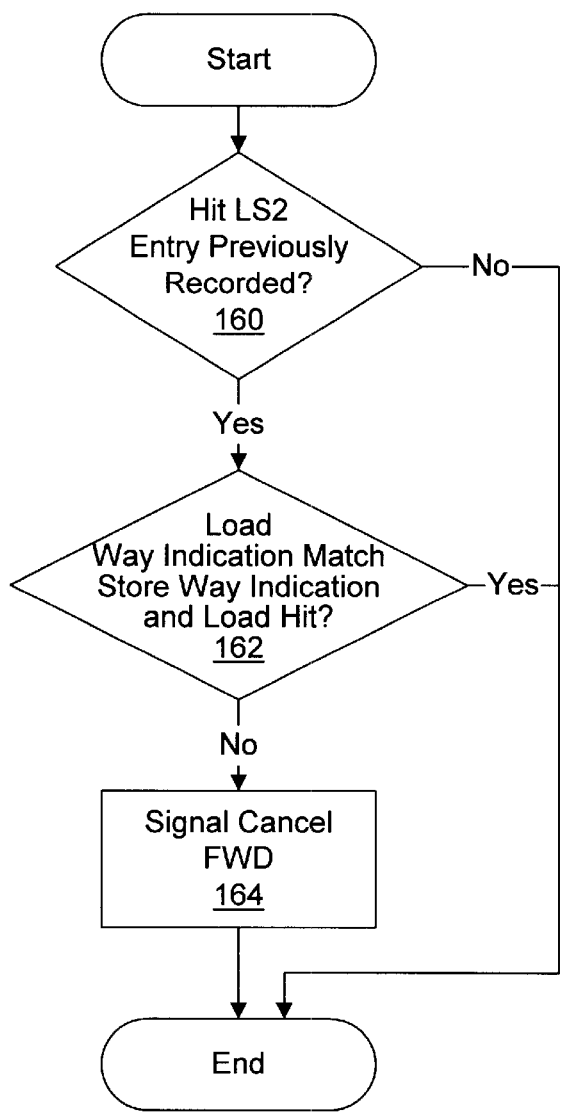
FIG. 10 is a flowchart illustrating operation of one embodiment of the control circuit shown in FIG. 6 during verification that the load address hits the store address.

FIG. 10 is a flowchart illustrating operation of one embodiment of hit control circuit 132 during the probing of a load to verify forwarding from LS2 buffer 62 (e.g. during the response pipeline stage of a load's probe). Other embodiments are possible and contemplated. While the steps shown in FIG. 10 are illustrated in a particular order for ease of understanding, any suitable order may be used. Additionally, steps may be performed in parallel by combinatorial logic within hit control circuit 132.

Hit control circuit 132 determines if an entry is recorded in hit entry register 134 (decision block 160). For example, hit entry register 134 may include a valid bit which may be set when data is forwarded based on the index comparisons and the store being a hit and may be reset after verification of the load hitting and the way indications matching. If an entry is not recorded in hit entry register 134, hit control circuit 132 may take no additional action with respect to the load. If an entry is recorded in hit entry register 134, hit control circuit 134 determines if the load way indication matches the store way indication of the entry recorded in hit entry register 134 (decision block 162) and the load is a hit. If the load is a miss or the load way indication does not match the store way indication, hit control circuit 132 asserts the cancel FWD signal (step 164). If the load is a hit and the load way indication matches the store way indication of the entry recorded in hit entry register 134, hit control circuit 132 may take no additional action with respect to the load.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

Computer Systems

Figure 11:
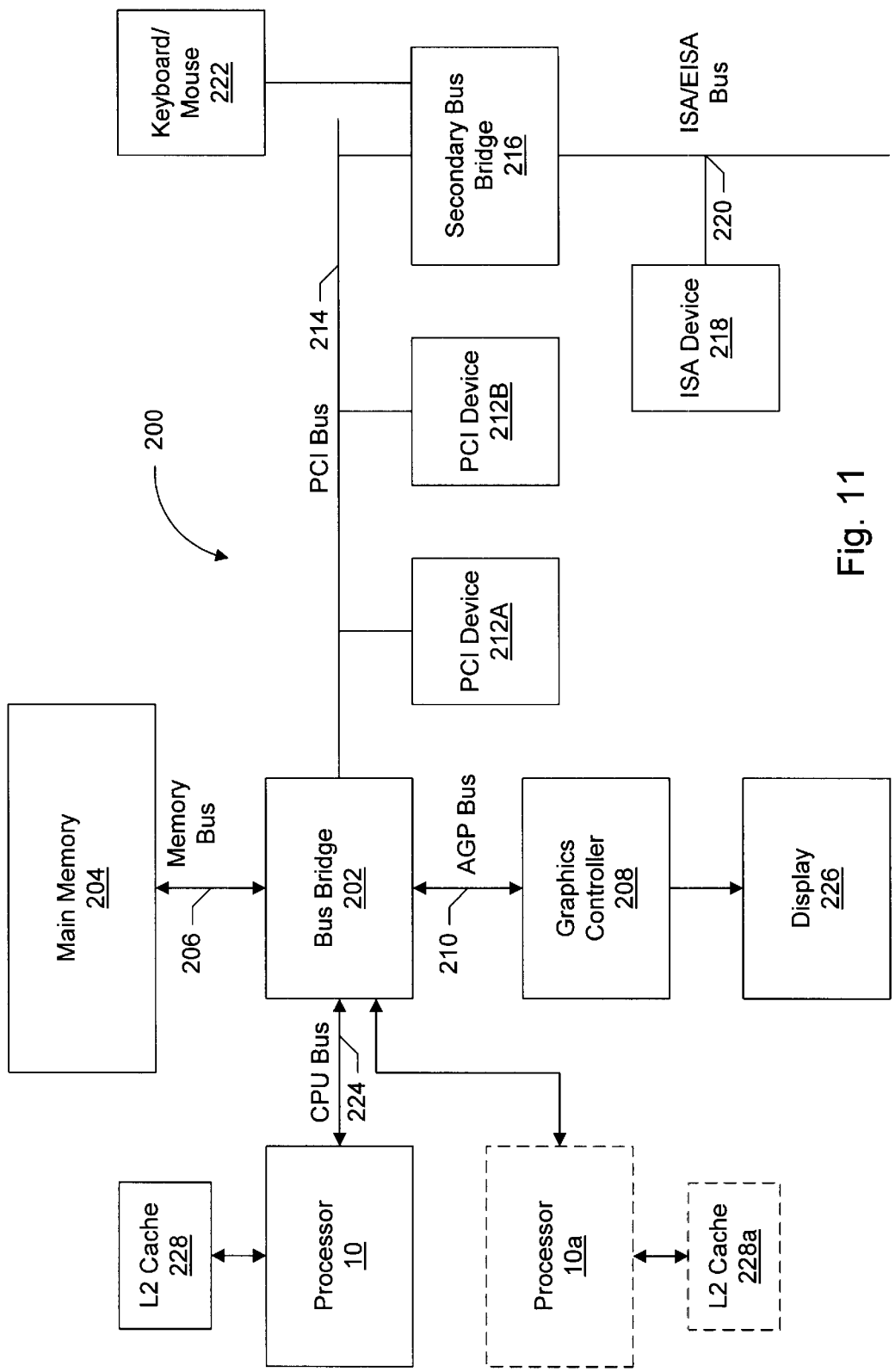
FIG. 11 is a block diagram of a first embodiment of a computer system.

Turning now to FIG. 11, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. CPU bus 224 and the interface to L2 cache 228 may comprise interfaces to which bus interface unit 37 is coupled.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control circuit for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 11) or may share CPU bus 224 with processor 10. Furthermore, processor 10a may be coupled to an optional L2 cache 228a similar to L2 cache 228.

Figure 12:
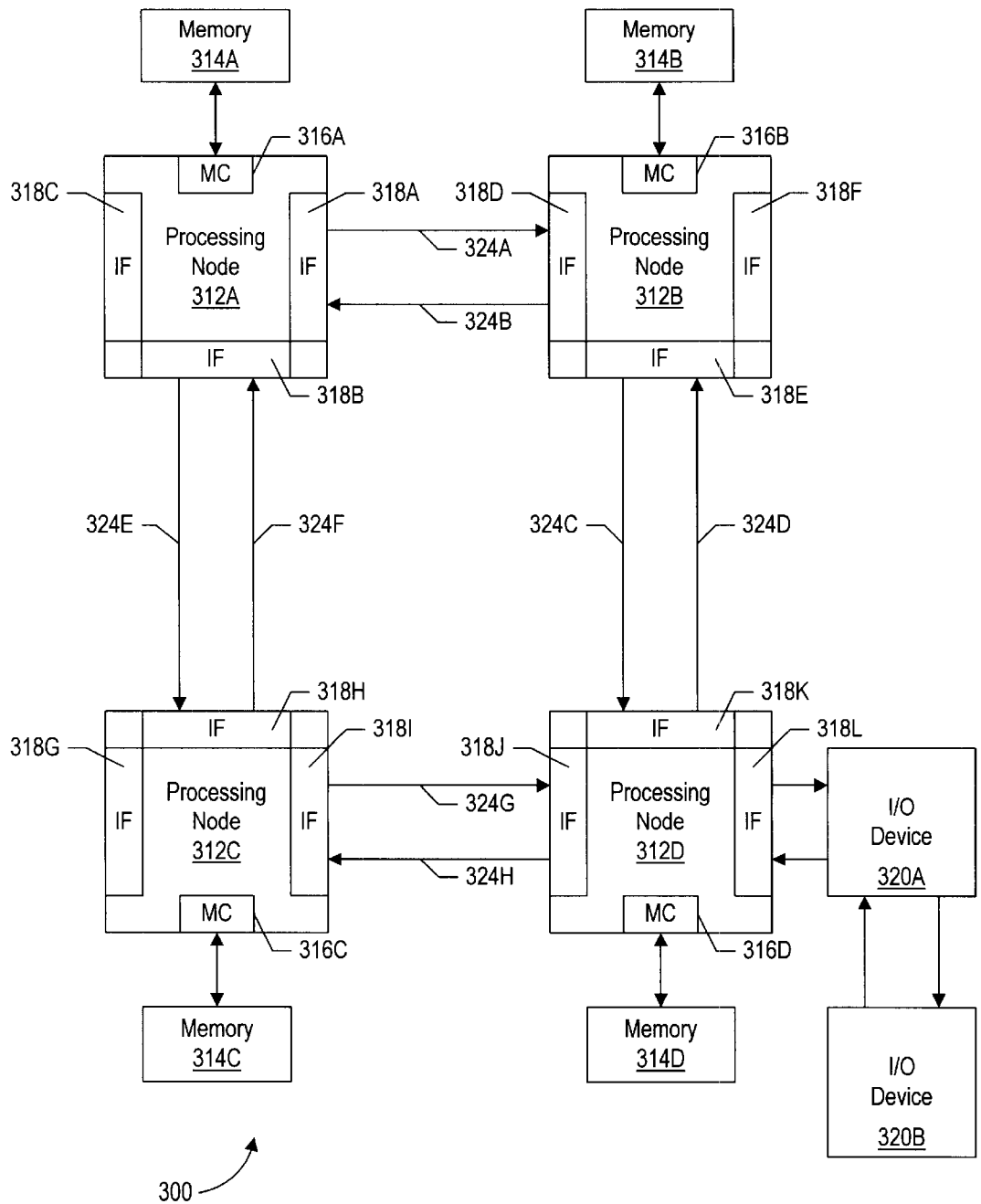
FIG. 12 is a block diagram of a second embodiment of a computer system.

Turning now to FIG. 12, another embodiment of a computer system 300 is shown. Other embodiments are possible and contemplated. In the embodiment of FIG. 12, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node Z=312A to processing node 312B and lines 324B are used to transmit packets from processing node 312B to processing node 312A). Other sets of lines 324C–324H are used to transmit packets between other processing nodes as illustrated in FIG. 12. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a noncoherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 12. Any suitable routing algorithm may be used. Other embodiments of computer system 300 may include more or fewer processing nodes then the embodiment shown in FIG. 12.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, a processing node 312A–312D may comprise processor 10. External interface unit 46 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. An apparatus comprising:
a buffer including a plurality of entries, wherein each of said plurality of entries is configured to store: (i) at least an index portion of a store address of a store memory operation, (ii) a hit indication indicative of whether or not said store memory operation hits in a data cache, and (iii) store data corresponding to said store memory operation; and
circuitry coupled to said buffer and coupled to receive: (i) said index portion of a load address of a load memory operation probing said data cache, and (ii) a load hit signal indicative of whether or not said load memory operation hits in said data cache, wherein said circuitry is configured to cause said store data to be forwarded from a first entry of said plurality of entries responsive to said index portion stored in said first entry matching said index portion of said load address and further responsive to said hit indication in said first entry indicating hit and said load hit signal indicating hit.

2. The apparatus as recited in claim 1 wherein said circuitry is configured to assert a forward signal responsive to a match between said index portion of said load address and said index portion of said store address.

3. The apparatus as recited in claim 2 wherein said circuitry is configured to assert said forward signal further responsive to said hit indication indicating hit.

4. The apparatus as recited in claim 3 wherein said circuitry is configured to subsequently receive said load hit signal and to assert a cancel forward signal responsive to said load hit signal indicating that said load misses in said data cache.

5. The apparatus as recited in claim 4 wherein said each of said plurality of entries is configured to store a store way indication indicating a way of said data cache in which said store memory operation hits.

6. The apparatus as recited in claim 5 wherein said circuitry is further coupled to receive a load way indication indicating said way of said data cache in which said load memory operation hits, and wherein said circuitry is configured to assert said cancel forward signal responsive to said store way indication stored in said first entry mismatching with said load way indication.

7. The apparatus as recited in claim 1 wherein said each of said plurality of entries is configured to store a store way indication indicating a way of said data cache in which said store memory operation hits.

8. The apparatus as recited in claim 7 wherein said circuitry is further coupled to receive a load way indication indicating said way of said data cache in which said load memory operation hits, and wherein said circuitry is configured to cause said store data to be forwarded further responsive to a match between said load way indication and said store way indication stored in said first entry.

9. A processor comprising:
a data cache; and
a load/store unit coupled to said data cache, wherein said load/store unit includes a buffer including a plurality of entries, wherein each of said plurality of entries is configured to store: (i) at least an index portion of a store address of a store memory operation, (ii) a hit indication indicative of whether or not said store memory operation hits in said data cache, and (iii) store data corresponding to said store memory operation, wherein said load/store unit is configured to probe said data cache with a load address and to receive a hit signal in response thereto from said data cache, and wherein said load/store unit is configured to determine that store data is to be forwarded from a first entry of said plurality of entries responsive to an index portion of said load address matching said index portion stored in said first entry and further responsive to said hit indication in said first entry indicating hit and said hit signal indicating hit.

10. The processor as recited in claim 9 wherein said load/store unit is configured to assert a forward data signal to said data cache, and wherein said data cache is configured to forward said store data in place of cache data read from said data cache.

11. The processor as recited in claim 10 wherein said load/store unit is configured to assert said forward data signal responsive to said index portion of said load address matching said index portion stored in said first entry.

12. The processor as recited in claim 11 wherein said load/store unit is configured to assert said forward data signal further responsive to said hit indication in said first entry indicating hit.

13. The processor as recited in claim 12 wherein said load/store unit is configured to assert a cancel forward signal responsive to said hit signal indicating miss.

14. The processor as recited in claim 13 further comprising one or more reservation stations coupled to receive said cancel forward signal, wherein said one or more reservation stations are configured to invalidate said store data forwarded for said load responsive to said cancel forward signal.

15. The processor as recited in claim 13 wherein said each of said plurality of entries is configured to store a store way indication indicating a way of said data cache in which said store memory operation hits.

16. The processor as recited in claim 15 wherein said data cache is configured to provide a load way indication to said load/store unit indicating a way of said data cache in which said load memory operation hits, and wherein said load/store unit is configured to assert said cancel forward signal responsive to said store way indication in said first entry mismatching said load way indication.

17. The processor as recited in claim 9 wherein said each of said plurality of entries is configured to store a store way indication indicating a way of said data cache in which said store memory operation hits.

18. The processor as recited in claim 17 wherein said data cache is configured to provide a load way indication to said load/store unit indicating a way of said data cache in which said load memory operation hits, and wherein said load/store unit is configured to determine that store data is to be forwarded from said first entry further responsive to said store way indication stored in said first entry matching said load way indication.

19. A method comprising:
probing a data cache with a load address;
comparing an index portion of said load address to an index portion of a store address stored in a buffer; and
forwarding store data corresponding to said store address for a load memory operation corresponding to said load address, said forwarding responsive to said comparing determining that said index portion of said load address matches said index portion of said store address and further responsive to both said load address and said store address hitting in a data cache.

20. The method as recited in claim 19 wherein said forwarding comprises asserting a forward data signal responsive to said comparing determining that said index portion of said load address matches said index portion of said store address.

21. The method as recited in claim 20 wherein said asserting is further responsive to said store address hitting in said data cache.

22. The method as recited in claim 21 wherein said forwarding further comprises asserting a cancel forward signal responsive to said load address missing in said data cache.

23. The method as recited in claim 22 further comprising:
comparing a store way indication stored in said buffer to a load way indication corresponding to said load address, said store way indication indicative of a way of said data cache in which said store address hits and said load way indication indicative of a way of said data cache in which said load address hits; and
asserting said cancel signal responsive to said comparing a store way indication determining a mismatch.

24. The method as recited in claim 19 further comprising:
comparing a store way indication stored in said buffer to a load way indication corresponding to said load address, said store way indication indicative of a way of said data cache in which said store address hits and said load way indication indicative of a way of said data cache in which said load address hits; and
said forwarding store data further responsive to said comparing a store way indication determining a match.

* * * * *